(12) United States Patent
Robert et al.

(10) Patent No.: US 11,245,921 B2
(45) Date of Patent: Feb. 8, 2022

(54) MULTIPLE PREDICTOR CANDIDATES FOR MOTION COMPENSATION

(71) Applicant: InterDigital VC Holdings, Inc., Wilmington, DE (US)

(72) Inventors: Antoine Robert, Cesson-Sevigne (FR); Fabrice Leleannec, Cesson-Sevigne (FR); Tangi Poirier, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/622,895

(22) PCT Filed: Jun. 25, 2018

(86) PCT No.: PCT/EP2018/066975
§ 371 (c)(1),
(2) Date: Dec. 13, 2019

(87) PCT Pub. No.: WO2019/002215
PCT Pub. Date: Jan. 3, 2019

(65) Prior Publication Data
US 2020/0221120 A1    Jul. 9, 2020

(30) Foreign Application Priority Data

Jun. 26, 2017  (EP) ..................................... 17305797
Mar. 30, 2018  (EP) ..................................... 18305386

(51) Int. Cl.
*H04N 19/513*    (2014.01)
*H04N 19/105*    (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11); *H04N 19/52* (2014.11)

(58) Field of Classification Search
None
See application file for complete search history.

(56) References Cited

U.S. PATENT DOCUMENTS 6,212,235 B1   4/2001   Nieweglowski et al.
7,567,617 B2   7/2009   Holcomb
(Continued)

FOREIGN PATENT DOCUMENTS

DE    69623342 T2    4/2003
EP    1528812 B1     5/2005
(Continued)

OTHER PUBLICATIONS

Chen et al., "Algorithm Description of Joint Exploration Test Model (JEM 6)", Document JVET-F1001-v2, Joint Video Exploration Team of ITU-T SG 16 WP 3 and ISO/IEC JTC 1/SC 29/WG 11, 6th Meeting: Hobart, AU, Mar. 31-Apr. 7, 2017.
(Continued)

*Primary Examiner* — Chikaodili E Anyikire
(74) *Attorney, Agent, or Firm* — Xiaoan Lu

(57) ABSTRACT

Different implementations are described, particularly implementations for selecting a predictor candidate from a set of multiple predictor candidates for motion compensation of a picture block based on a motion model. The motion model, may be, e.g., an affine model in a merge mode for a video content encoder or decoder. In an embodiment, a predictor candidate is selected from the set based on a motion model for each of the multiple predictor candidates, and may be based on a criterion such as, e.g., a rate distortion cost. The corresponding motion field is determined based on, e.g., one
(Continued)

or more corresponding control point motion vectors for the block being encoded or decoded. The corresponding motion field of an embodiment identifies motion vectors used for prediction of sub-blocks of the block being encoded or decoded.

20 Claims, 21 Drawing Sheets

(51) Int. Cl.
*H04N 19/139* (2014.01)
*H04N 19/176* (2014.01)
*H04N 19/52* (2014.01)

(56) References Cited

U.S. PATENT DOCUMENTS

| | | | | |
|---|---|---|---|---|
| 10,448,010 | B2* | 10/2019 | Chen | H04N 19/176 |
| 10,462,462 | B2* | 10/2019 | Chien | H04N 19/52 |
| 10,798,403 | B2* | 10/2020 | Ikai | H04N 19/52 |
| 2017/0006284 | A1 | 1/2017 | Gokhale et al. | |
| 2018/0098063 | A1* | 4/2018 | Chen | H04N 19/105 |
| 2018/0192069 | A1* | 7/2018 | Chen | H04N 19/52 |
| 2019/0037231 | A1* | 1/2019 | Ikai | H04N 19/52 |
| 2019/0082191 | A1* | 3/2019 | Chuang | H04N 19/176 |
| 2019/0342547 | A1* | 11/2019 | Lee | H04N 19/46 |

FOREIGN PATENT DOCUMENTS

| | | |
|---|---|---|
| EP | 2466894 B1 | 5/2017 |
| RU | 2577486 C2 | 3/2016 |

OTHER PUBLICATIONS

Lin et al., "Affine transform prediction for next generation video coding", ITU Telecommunication Standardization Sector, Study Period 2013-2016, COM 16-C1016 R1-E, Sep. 2015.
Huang et al., "Affine Skip and Direct Modes for Efficient Video Coding", in Proc. IEEE Vis. Commun. Image Process., Nov. 2012, pp. 1-6.
Chen et al., "Algorithm Description of Joint Exploration Test Model 2", Document: JVET-B1001 v3, Joint Video Exploration Team of ITU-T SG 16 WP 3 and ISO/IEC JTC 1/SC 29/WG 11, 2nd Meeting: San Diego, USA, Feb. 20-26, 2016.
Chen et al., "Algorithm Description of Joint Exploration Test Model 5 (JEM5)", Document: JVET-E1001-v2, Joint Video Exploration Team, of ITU-T SG 16 WP 3 and ISO/IEC JTC 1/SC 29/WG 11, 5th Meeting, Geneva, CH, Jan. 12-20, 2017.

* cited by examiner

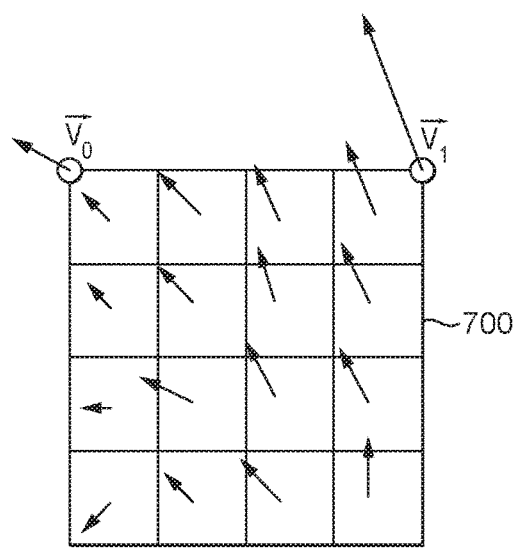
FIG. 7
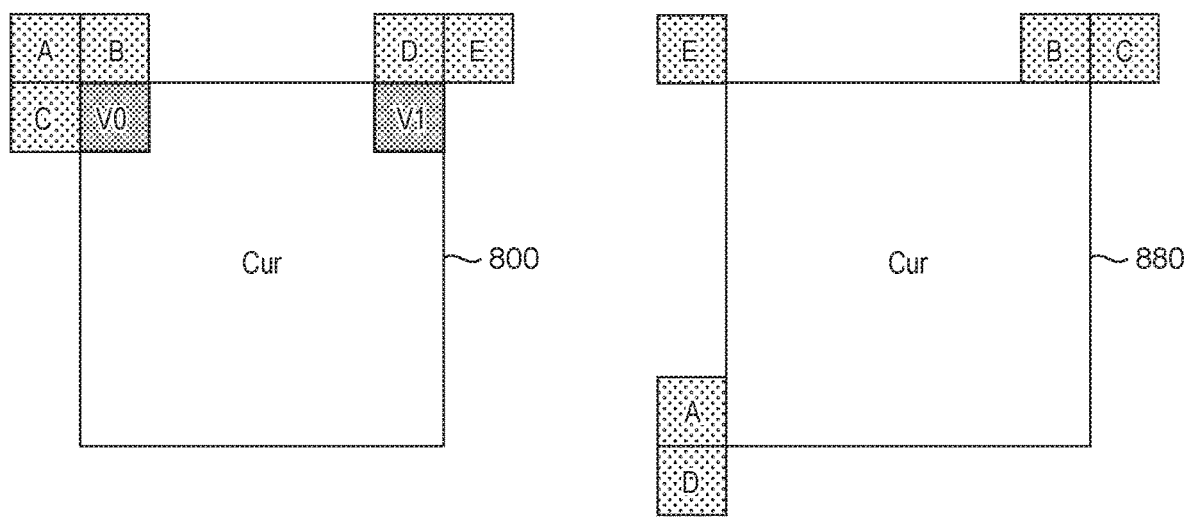
FIG. 8A
FIG. 8B

1300 retrieving, for a block being decoded in a picture, an index corresponding to a selected predictor candidate, wherein the selected predictor candidate is selected at an encoder by: determining, for a block being encoded in a picture, a set of predictor candidates; determining for each of multiple predictor candidates from the set of predictor candidates, one or more corresponding control point motion vectors for the block being encoded; determining for each of the multiple predictor candidates, based on the one or more corresponding control point motion vectors, a corresponding motion field based on a motion model for the each of the multiple predictor candidates from the set of predictor candidates; evaluating the multiple predictor candidates according to one or more criteria and based on the corresponding motion field; selecting a predictor candidate from the multiple predictor candidates based on the evaluating encoding an index for the selected predictor candidate from the set of predictor candidates ~1310 decoding the block based on the index corresponding to the selected predictor candidate ~1320

FIG. 13

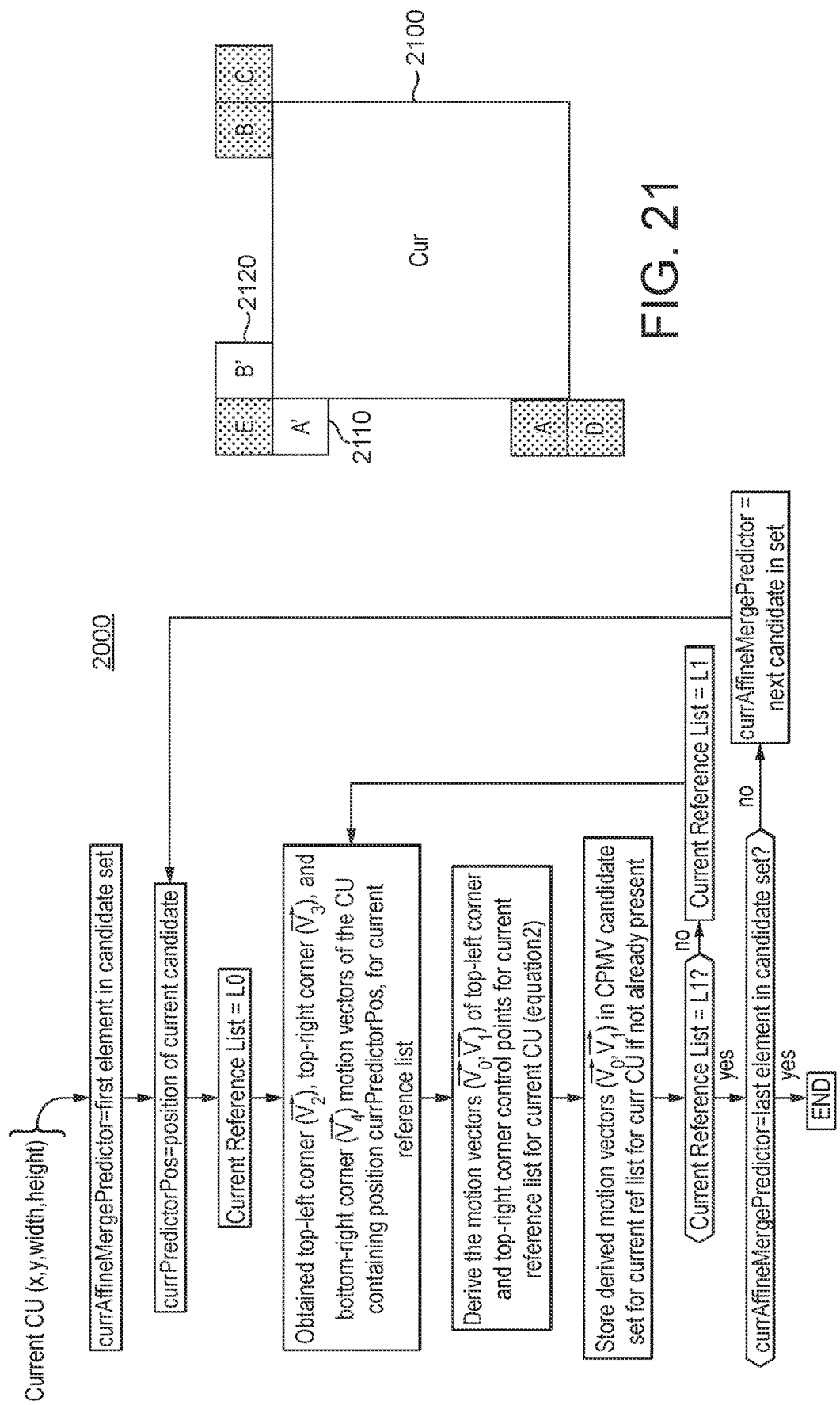

MULTIPLE PREDICTOR CANDIDATES FOR MOTION COMPENSATION

This application claims the benefit, under 35 U.S.C. § 371 of International Application No. PCT/EP18/066975, filed Jun. 25, 2018, which was published on Jan. 3, 2019, which claims the benefit of European Patent Application No. EP17305797.7 filed Jun. 26, 2017 and European Patent Application No. 18305386.7 filed Mar. 30, 2018.

TECHNICAL FIELD

At least one of the present embodiments generally relates to, e.g., a method or an apparatus for video encoding or decoding, and more particularly, to a method or an apparatus for selecting a predictor candidate from a set of multiple predictor candidates for motion compensation based on a motion model such as, e.g., an affine model, for a video encoder or a video decoder.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

SUMMARY

According to a general aspect of at least one embodiment, a method for video encoding is presented, comprising: determining, for a block being encoded in a picture, a set of predictor candidates having multiple predictor candidates; selecting a predictor candidate from the set of predictor candidates; determining for the selected predictor candidate from the set of predictor candidates, one or more corresponding control point motion vectors for the block; determining for the selected predictor candidate, based on the one or more corresponding control point motion vectors, a corresponding motion field based on a motion model for the selected predictor candidate, wherein the corresponding motion field identifies motion vectors used for prediction of sub-blocks of the block being encoded; encoding the block based on the corresponding motion field for the selected predictor candidate from the set of predictor candidates; and encoding an index for the selected predictor candidate from the set of predictor candidates.

According to another general aspect of at least one embodiment, a method for video decoding is presented, comprising: receiving, for a block being decoded in a picture, an index corresponding to a particular predictor candidate; determining, for the particular predictor candidate, one or more corresponding control point motion vectors for the block being decoded; determining for the particular predictor candidate, based on the one or more corresponding control point motion vectors, a corresponding motion field based on a motion model, wherein the corresponding motion field identifies motion vectors used for prediction of sub-blocks of the block being decoded; and decoding the block based on the corresponding motion field.

According to another general aspect of at least one embodiment, an apparatus for video encoding is presented, comprising: means for determining, for a block being encoded in a picture, a set of predictor candidates having multiple predictor candidates; means for selecting a predictor candidate from the set of predictor candidates; means for determining for the selected predictor candidate, based on the one or more corresponding control point motion vectors, a corresponding motion field based on a motion model for the selected predictor candidate, wherein the corresponding motion field identifies motion vectors used for prediction of sub-blocks of the block being encoded; means for encoding the block based on the corresponding motion field for the selected predictor candidate from the set of predictor candidates; and means for encoding an index for the selected predictor candidate from the set of predictor candidates.

According to another general aspect of at least one embodiment, an apparatus for video decoding is presented, comprising: means for receiving, for a block being decoded in a picture, an index corresponding to a particular predictor candidate; means for determining, for the particular predictor candidate, one or more corresponding control point motion vectors for the block being decoded; means for determining for the particular predictor candidate, based on the one or more corresponding control point motion vectors, a corresponding motion field based on a motion model, wherein the corresponding motion field identifies motion vectors used for prediction of sub-blocks of the block being decoded; and means for decoding the block based on the corresponding motion field.

According to another general aspect of at least one embodiment, an apparatus for video encoding is provided, comprising: one or more processors, and at least one memory. Wherein the one or more processors is configured to: determine, for a block being encoded in a picture, a set of predictor candidates having multiple predictor candidates; select a predictor candidate from the set of predictor candidates; determine for the selected predictor candidate from the set of predictor candidates, one or more corresponding control point motion vectors for the block; determine for the selected predictor candidate, based on the one or more corresponding control point motion vectors, a corresponding motion field based on a motion model for the selected predictor candidate, wherein the corresponding motion field identifies motion vectors used for prediction of sub-blocks of the block being encoded; encode the block based on the corresponding motion field for the selected predictor candidate from the set of predictor candidates; and encode an index for the selected predictor candidate from the set of predictor candidates. The at least one memory is for storing, at least temporarily, the encoded block and/or the encoded index.

According to another general aspect of at least one embodiment, an apparatus for video decoding is provided, comprising: one or more processors and at least one memory. Wherein the one or more processors is configured to: receive, for a block being decoded in a picture, an index corresponding to a particular predictor candidate; determine, for the particular predictor candidate, one or more corresponding control point motion vectors for the block being decoded; determine for the particular predictor candidate, based on the one or more corresponding control point motion vectors, a corresponding motion field based on a motion model, wherein the corresponding motion field identifies motion vectors used for prediction of sub-blocks of the block being decoded; and decode the block based on the corresponding motion field. The at least one memory is for storing, at least temporarily, the decoded block.

According to a general aspect of at least one embodiment, a method for video encoding is presented, comprising: determining, for a block being encoded in a picture, a set of predictor candidates; determining for each of multiple predictor candidates from the set of predictor candidates, one or more corresponding control point motion vectors for the block; determining for each of the multiple predictor candidates, based on the one or more corresponding control point motion vectors, a corresponding motion field based on a motion model for the each of the multiple predictor candidates from the set of predictor candidates; evaluating the multiple predictor candidates according to one or more criteria and based on the corresponding motion field; selecting a predictor candidate from the multiple predictor candidates based on the evaluating; and encoding the block based on the selected predictor candidate from the set of predictor candidates.

According to a general aspect of at least one embodiment, a method for video decoding is presented, comprising retrieving, for a block being decoded in a picture, an index corresponding to a selected predictor candidate. Wherein the selected predictor candidate is selected at an encoder by: determining, for a block being encoded in a picture, a set of predictor candidates; determining for each of multiple predictor candidates from the set of predictor candidates, one or more corresponding control point motion vectors for the block being encoded; determining for each of the multiple predictor candidates, based on the one or more corresponding control point motion vectors, a corresponding motion field based on a motion model for the each of the multiple predictor candidates from the set of predictor candidates; evaluating the multiple predictor candidates according to one or more criteria and based on the corresponding motion field; selecting a predictor candidate from the multiple predictor candidates based on the evaluating; and encoding an index for the selected predictor candidate from the set of predictor candidates. The method further comprises decoding the block based on the index corresponding to the selected predictor candidate.

According to another general aspect of at least one embodiment, a method may further comprise: evaluating the multiple predictor candidates according to one or more criteria and based on corresponding motion fields for each of the multiple predictor candidates; and selecting the predictor candidate from the multiple predictor candidates based on the evaluating.

According to another general aspect of at least one embodiment, an apparatus may further comprise: means for evaluating the multiple predictor candidates according to one or more criteria and based on corresponding motion fields for each of the multiple predictor candidates; and means for selecting the predictor candidate from the multiple predictor candidates based on the evaluating.

According to another general aspect of at least one embodiment, the one or more criteria is based on a rate distortion determination corresponding to one or more of the multiple predictor candidates from the set of predictor candidates.

According to another general aspect of at least one embodiment, decoding or encoding the block based on the corresponding motion field comprises decoding or encoding, respectively, based on predictors for the sub-blocks, the predictors being indicated by the motion vectors.

According to another general aspect of at least one embodiment, the set of predictor candidates comprises spatial candidates, and/or temporal candidates, of the block being encoded or decoded.

According to another general aspect of at least one embodiment, the motion model is an affine model.

According to another general aspect of at least one embodiment, the corresponding motion field for each position (x, y) inside the block being encoded or decoded is determined by:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

wherein $(v_{0x}, v_{0y})$ and $(v_{1x}, v_{1y})$ are the control point motion vectors used to generate the corresponding motion field, $(v_{0x}, v_{0y})$ corresponds to the control point motion vector of the top-left corner of the block being encoded or decoded, $(v_{1x}, v_{1y})$ corresponds to the control point motion vector of the top-right corner of the block being encoded or decoded and w is the width of the block being encoded or decoded.

According to another general aspect of at least one embodiment, the number of the spatial candidates is at least 5.

According to another general aspect of at least one embodiment, one or more additional control point motion vectors are added for the determining of the corresponding motion field based on a function of the determined one or more corresponding control point motion vectors.

According to another general aspect of at least one embodiment, the function includes one or more of: 1) mean, 2) weighted mean, 3) unique mean, 4) average, 5) median, or 6) uni-directional part of one of the 1) to 6) above, of the determined one or more corresponding control point motion vectors.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above.

The present embodiments also provide a computer program product including instructions for performing any of the methods described.

BRIEF DESCRIPTION OF THE DRAWINGS

FIG. 7 illustrates an example of 4×4 sub-CU based affine motion vector field used in Joint Exploration Model (JEM).

FIG. 8A illustrates an examples of motion vector prediction candidates for Affine Inter CUs.

FIG. 8B illustrates an example of motion vector prediction candidates in the Affine Merge mode.

FIG. 13 also illustrates another example method according to a general aspect of at least one embodiment.

FIG. 20 illustrates an example of a derivation process of top-left and top-right corner CPMVs for each predictor candidate according to a general aspect of at least one embodiment.

FIG. 21 illustrates an example of an augmented set of spatial predictor candidates according to a general aspect of at least one embodiment.

DETAILED DESCRIPTION

Figure 1:
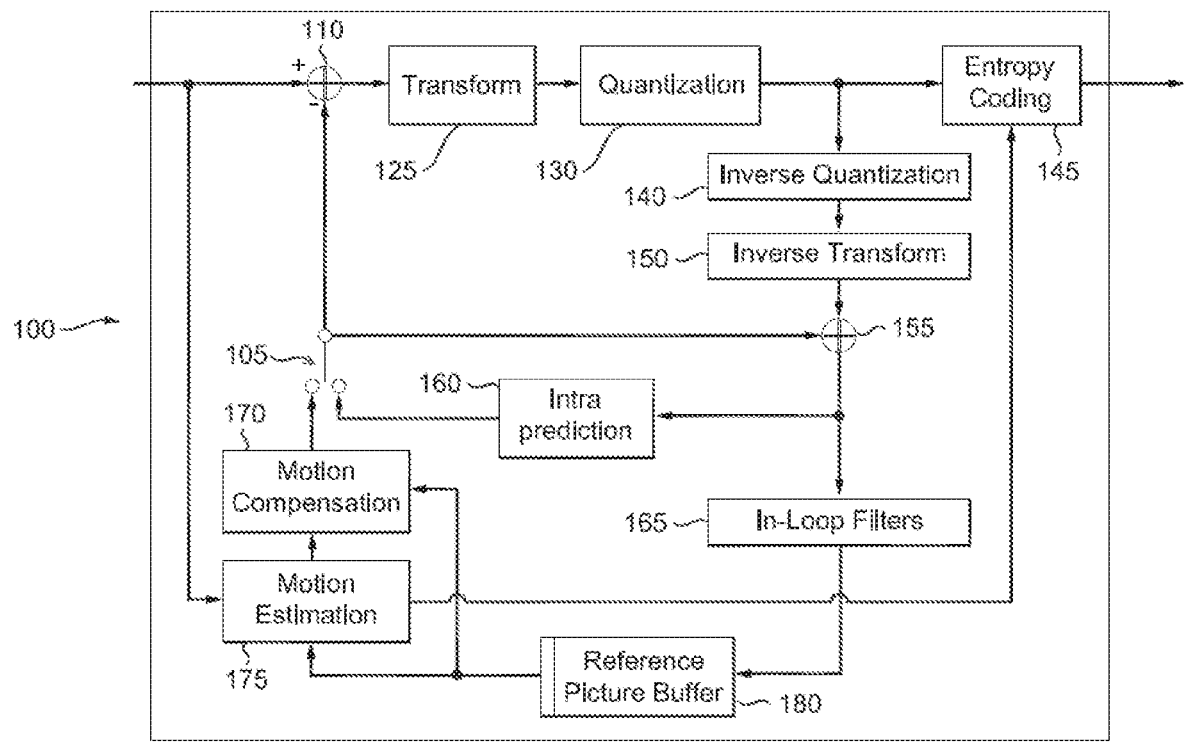
FIG. 1 illustrates a block diagram of an embodiment of an HEVC (High Efficiency Video Coding) video encoder.

FIG. 1 illustrates an exemplary High Efficiency Video Coding (HEVC) encoder 100. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265").

In HEVC, to encode a video sequence with one or more pictures, a picture is partitioned into one or more slices where each slice can include one or more slice segments. A slice segment is organized into coding units, prediction units, and transform units.

In the present application, the terms "reconstructed" and "decoded" may be used interchangeably, the terms "encoded" or "coded" may be used interchangeable, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figures 2A, 2B:
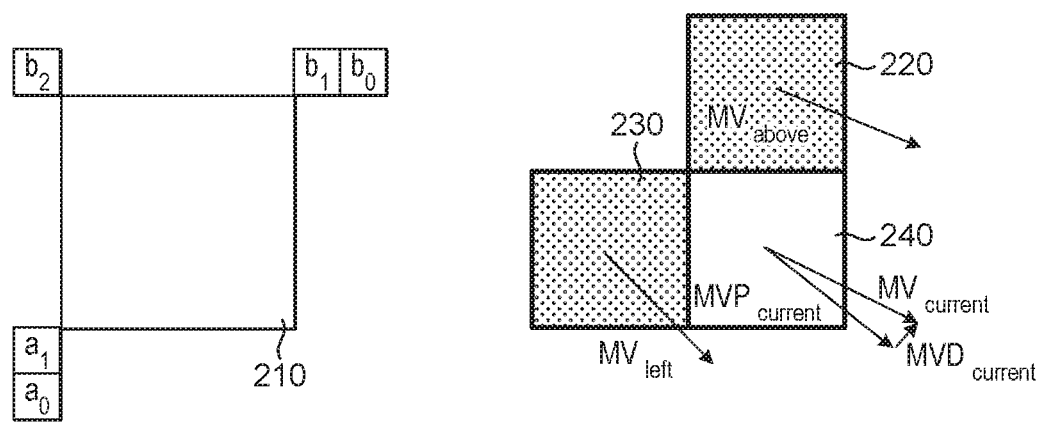
FIG. 2A is a pictorial example depicting HEVC reference sample generation.
FIG. 2B is a pictorial example depicting intra prediction directions in HEVC.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1, b_1, b_0, a_0, b_2$, and then the redundancy in candidates is removed.

The motion vector of the collocated location in a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$ can be directly used as the temporal candidate. Otherwise, a scaled motion vector, tb/td*$mv_{col}$, is used as the temporal candidate. Depending on where the current PU is located, the collocated PU is determined by the sample location at the bottom-right or at the center of the current PU.

The maximum number of merge candidates, N, is specified in the slice header. If the number of merge candidates is larger than N, only the first N−1 spatial candidates and the temporal candidate are used. Otherwise, if the number of merge candidates is less than N, the set of candidates is filled up to the maximum number N with generated candidates as combinations of already present candidates, or null candidates. The candidates used in the merge mode may be referred to as "merge candidates" in the present application.

If a CU indicates a skip mode, the applicable index for the merge candidate is indicated only if the list of merge candidates is larger than 1, and no further information is coded for the CU. In the skip mode, the motion vector is applied without a residual update.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Only two spatial motion candidates are chosen in AMVP. The first spatial motion candidate is chosen from left positions $\{a_0, a_1\}$ and the second one from the above positions $\{b_0, b_1, b_2\}$, while keeping the searching order as indicated in the two sets. If the number of motion vector candidates is not equal to two, the temporal MV candidate can be included. If the set of candidates is still not fully filled, then zero motion vectors are used.

If the reference picture index of a spatial candidate corresponds to the reference picture index for the current PU (i.e., using the same reference picture index or both using long-term reference pictures, independently of the reference picture list), the spatial candidate motion vector is used directly. Otherwise, if both reference pictures are short-term ones, the candidate motion vector is scaled according to the distance (tb) between the current picture and the reference picture of the current PU and the distance (td) between the current picture and the reference picture of the spatial candidate. The candidates used in the AMVP mode may be referred to as "AMVP candidates" in the present application.

For ease of notation, a block tested with the "merge" mode at the encoder side or a block decoded with the "merge" mode at the decoder side is denoted as a "merge" block, and a block tested with the AMVP mode at the encoder side or a block decoded with the AMVP mode at the decoder side is denoted as an "AMVP" block.

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from $MV_{left}$ and $MV_{above}$ as $MVP_{current}$. A motion vector difference then can be calculated as $MVD_{current} = MV_{current} - MVP_{current}$.

Motion compensation prediction can be performed using one or two reference pictures for prediction. In P slices, only a single prediction reference can be used for Inter prediction, enabling uni-prediction for a prediction block. In B slices, two reference picture lists are available, and uni-prediction or bi-prediction can be used. In bi-prediction, one reference picture from each of the reference picture lists is used.

In HEVC, the precision of the motion information for motion compensation is one quarter-sample (also referred to as quarter-pel or ¼-pel) for the luma component and one eighth-sample (also referred to as ⅛-pel) for the chroma components for the 4:2:0 configuration. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
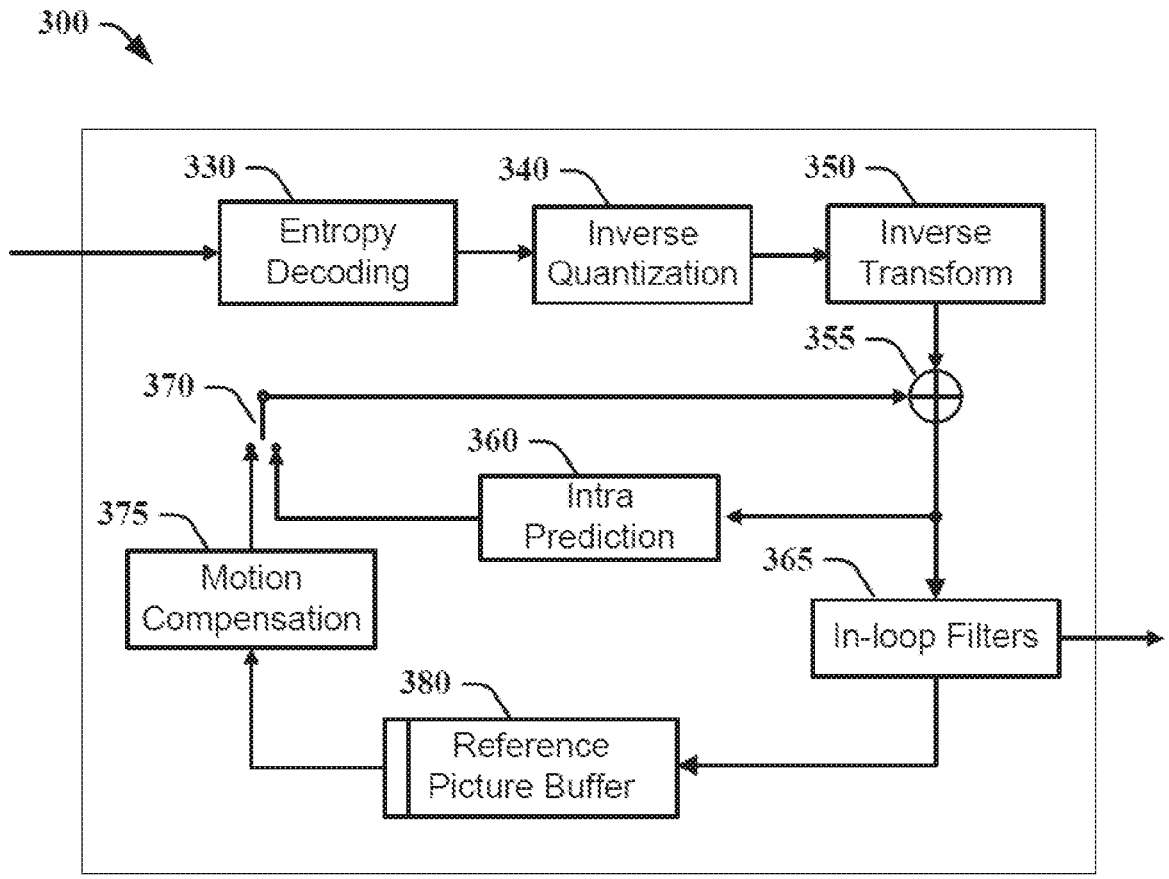
FIG. 3 illustrates a block diagram of an embodiment of an HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

Figure 4:
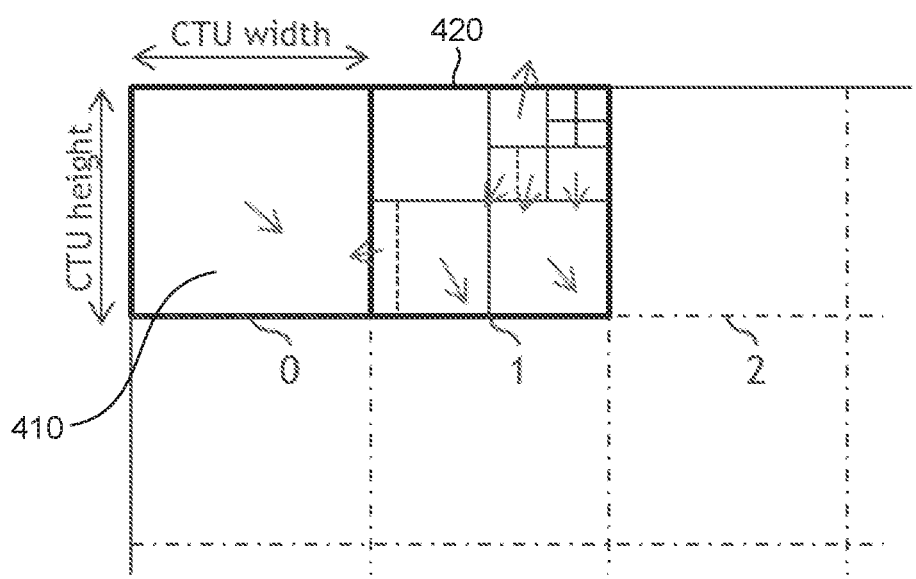
FIG. 4 illustrates an example of Coding Tree Unit (CTU) and Coding Tree (CT) concepts to represent a compressed HEVC picture.
Figure 5:
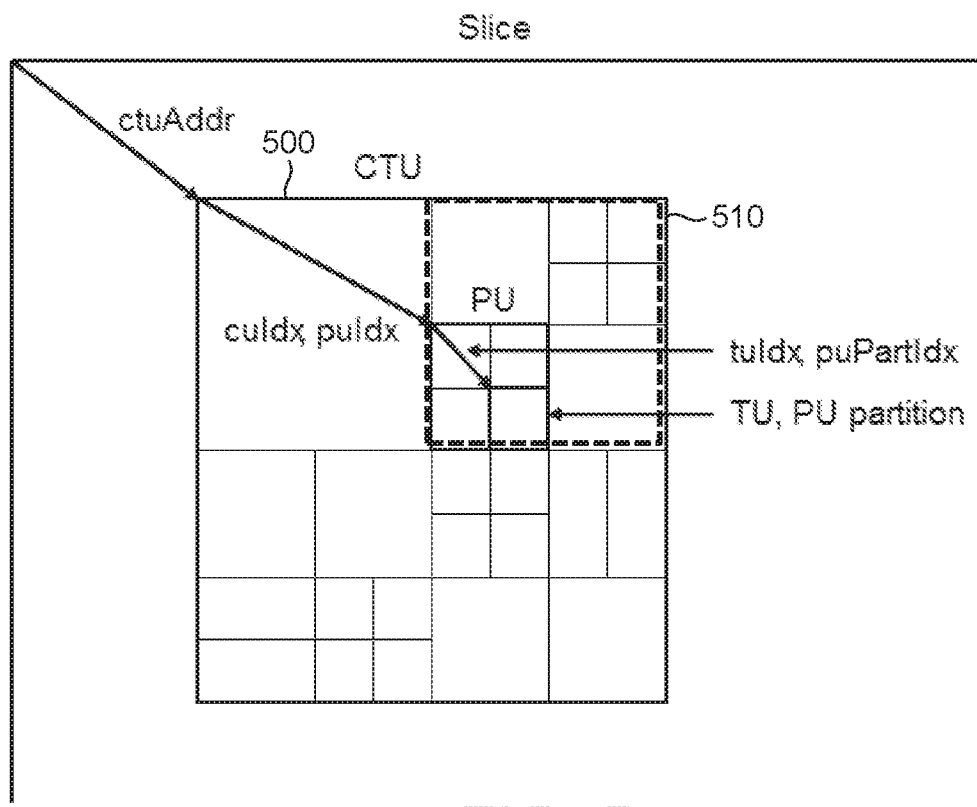
FIG. 5 illustrates an example of divisions of a Coding Tree Unit (CTU) into Coding Units (CUs), Prediction Units (PUs), and Transform Units (TUs).

As mentioned, in HEVC, motion compensated temporal prediction is employed to exploit the redundancy that exists between successive pictures of a video. To do that, a motion vector is associated with each prediction unit (PU). As explained above, each CTU is represented by a Coding Tree in the compressed domain. This is a quad-tree division of the CTU, where each leaf is called a Coding Unit (CU) and is also illustrated in FIG. 4 for CTUs 410 and 420. Each CU is then given some Intra or Inter prediction parameters as prediction information. To do so, a CU may be spatially partitioned into one or more Prediction Units (PUs), each PU being assigned some prediction information. The Intra or Inter coding mode is assigned on the CU level. These concepts are further illustrated in FIG. 5 for an exemplary CTU 500 and a CU 510.

In HEVC, one motion vector is assigned to each PU. This motion vector is used for motion compensated temporal prediction of the considered PU. Therefore, in HEVC, the motion model that links a predicted block and its reference block simply consists of a translation or calculation based on the reference block and the corresponding motion vector.

To make improvements to HEVC, the reference software and/or documentation JEM (Joint Exploration Model) is being developed by the Joint Video Exploration Team (JVET). In one JEM version (e.g., "Algorithm Description of Joint Exploration Test Model 5", Document JVET-E1001_v2, Joint Video Exploration Team of ISO/IEC JTC1/SC29/WG11, 5th meeting, 12-20 Jan. 2017, Geneva, CH), some further motion models are supported to improve temporal prediction. To do so, a PU can be spatially divided into sub-PUs and a model can be used to assign each sub-PU a dedicated motion vector.

In more recent versions of the JEM (e.g., "Algorithm Description of Joint Exploration Test Model 2", Document JVET-B1001_v3, Joint Video Exploration Team of ISO/IEC JTC1/SC29/WG11, 2nd meeting, 20-26 Feb. 2016, San Diego, USA"), a CU is no longer specified to be divided into PUs or TUs. Instead, more flexible CU sizes may be used, and some motion data are directly assigned to each CU. In this new codec design under the newer versions of JEM, a CU may be divided into sub-CUs and a motion vector may be computed for each sub-CU of the divided CU.

Figure 6:
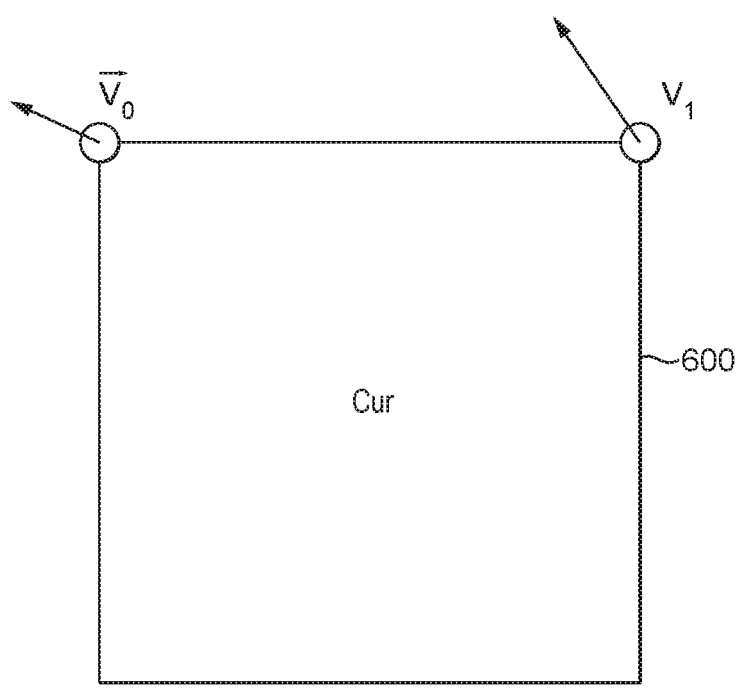
FIG. 6 illustrates an example of an affine model as the motion model used in Joint Exploration Model (JEM).

One of the new motion models introduced in the JEM is the use of an affine model as the motion model to represent the motion vectors in a CU. The motion model used is illustrated by FIG. 6 and is represented by Equation 1 as shown below. The affine motion field comprises the following motion vector component values for each position (x, y) inside the considered block 600 of FIG. 6:

affine motion model used to generate
the motion field inside a $CU$ for prediction, $$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation 1}$$

wherein $(v_{0x}, v_{0y})$ and $(v_{1x}, v_{1y})$ are the control point motion vectors used to generate the corresponding motion field, $(v_{0x}, v_{0y})$ corresponds to the control point motion vector of the top-left corner of the block being encoded or decoded, $(v_{1x}, v_{1y})$ corresponds to the control point motion vector of the top-right corner of the block being encoded or decoded, and w is the width of the block being encoded or decoded.

To reduce complexity, a motion vector is computed for each 4×4 sub-block (sub-CU) of the considered CU 700, as illustrated in FIG. 7. An affine motion vector is computed from the control point motion vectors, for each center position of each sub-block. The obtained MV is represented at 1/16 pel accuracy. As a result, the compensation of a coding unit in the affine mode consists in motion compensated prediction of each sub-block with its own motion vector. These motion vectors for the sub-blocks are shown respectively as an arrow for each of the sub-blocks in FIG. 7.

Since, in the JEM, the seeds are saved within the corresponding 4×4 sub-blocks, the affine mode can only be used for CU with a width and a height larger to 4 (to have independent sub-blocks for each seed). For example, in a 64×4 CU there is only one left sub-block to save the top-left and the bottom-left seeds, and in a 4×32 CU there is only one top sub-block for the top-left and top-right seeds; in the JEM, it is not possible to correctly save the seeds in such thin CU. With our proposal, since seeds are saved separately, we are able to process such thin CU with a width or a height equal to 4.

Referring back to the example of FIG. 7, an affine CU is defined by its associated affine model composed of three motion vectors, called the affine model seeds, as the motion vectors from the top-left, top-right and bottom-left corners of the CU (v0, v1 and v2 in FIG. 7). This affine model then allows calculating the affine motion vector field within the CU which is performed on a 4×4 sub-block basis (black motion vectors on FIG. 7). In the JEM, these seeds are attached to the top-left, top-right and bottom-left 4×4 sub-blocks in the considered CU. In the proposed solution, the affine model seeds are stored separately as a motion information associated to the whole CU (like the IC flag, for example). The motion model is thus decoupled from the motion vectors used for actual motion compensation at the 4×4 block level. This new storage may allow saving the complete motion vector field at the 4×4 sub-block level. It also allows using affine motion compensation for block of size 4 in width or height.

Affine motion compensation may be used in 2 ways in the JEM: Affine Inter (AF_INTER) mode and Affine Merge mode. They are introduced in the following sections.

Affine Inter (AF_INTER) mode: A CU in AMVP mode, whose size is larger than 8×8, may be predicted in Affine Inter mode. This is signaled through a flag in the bit-stream. The generation of the Affine Motion Field for that inter CU includes determining control point motion vectors (CPMVs), which are obtained by the decoder through the addition of a motion vector differential and a control point motion vector prediction (CPMVP). The CPMVPs are a pair of motion vector candidates, respectively taken from the set (A, B, C) and (D, E) illustrated in FIG. 8A for a current CU 800 being encoded or decoded.

Affine Merge mode: In Affine Merge mode, a CU-level flag indicates if a merge CU employs affine motion compensation. If so, then the first available neighboring CU that has been coded in an Affine mode is selected among the ordered set of candidate positions A, B, C, D, E of FIG. 8B for a current CU 880 being encoded or decoded. Note that this ordered set of candidate positions in JEM is the same as the spatial neighbor candidates in the merge mode in HEVC as shown in FIG. 2A and as explained previously.

Figure 9:
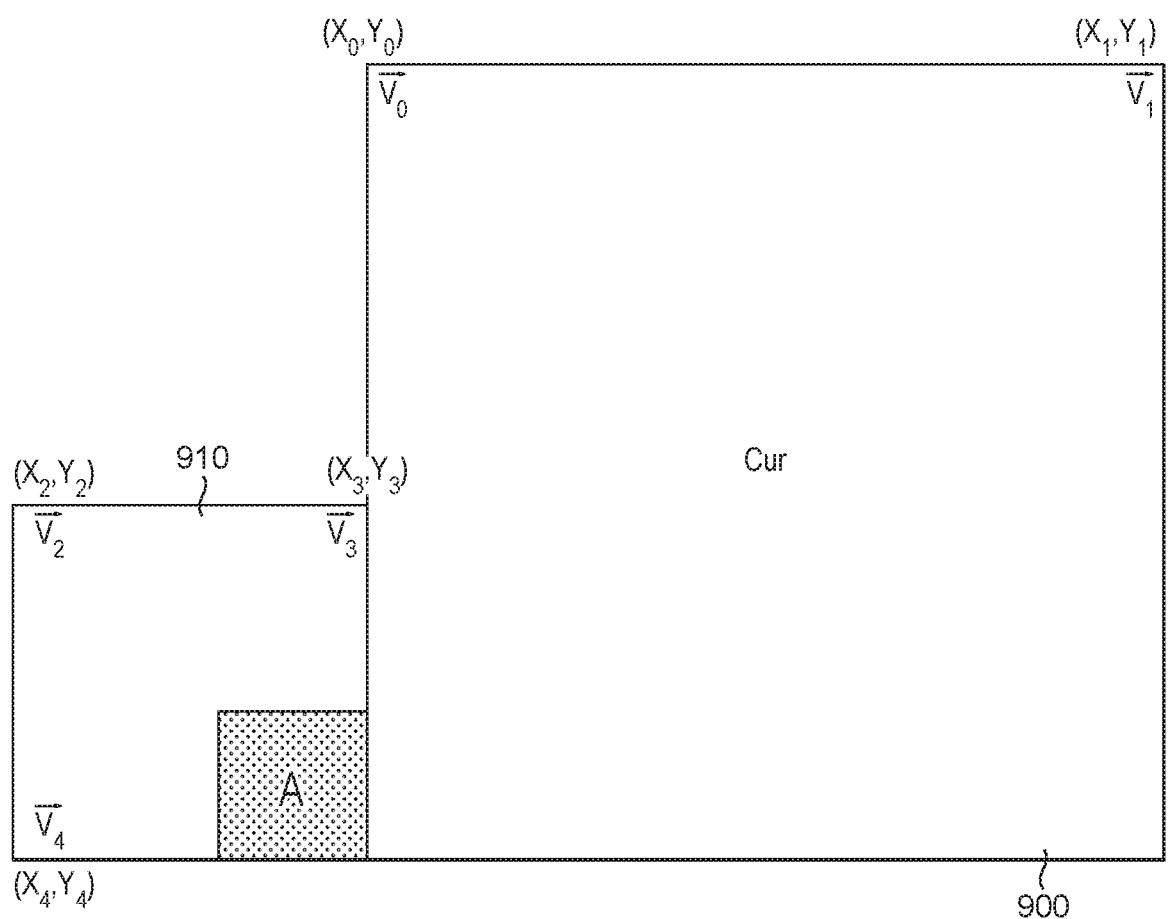
FIG. 9 illustrates an example of spatial derivation of affine control point motion vectors in the case of Affine Merge mode motion model.

Once the first neighboring CU in Affine mode is obtained, then the 3 CPMVs $\vec{v_2}$, $\vec{v_3}$, and $\vec{v_4}$ from the top-left, top-right and bottom-left corners of the neighboring affine CU are retrieved or calculated. For example, FIG. 9 shows that this first determined neighboring CU 910 in Affine mode being in the A position of FIG. 8B for a current CU 900 being encoded or decoded. Based on these three CPMVs of the neighboring CU 910, the two CPMVs of the top-left and top-right corners of the current CU 900 are derived as follows:

derivation of CPMVs of the current
CU based on the three control-point motion
vectors of the selected neighboring CU $$\vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$

$$\vec{v_1} = \vec{v_0} + (\vec{v_3} - \vec{v_2})\left(\frac{W_{curr}}{W_{neighb}}\right)$$

Equation 2

When the control point motion vectors $\vec{v_0}$ and $\vec{v_1}$ of the current CU are obtained, the motion field inside the current CU being encoded or decoded is computed on a 4×4 sub-CU basis, through the model of Equation 1 as described above in connection with FIG. 6.

Accordingly, a general aspect of at least one embodiment aims to improve the performance of the Affine Merge mode in JEM so that the compression performance of a considered video codec may be improved. Therefore, in at least one embodiment, an augmented and improved affine motion compensation apparatus and method are presented, for example, for Coding Units that are coded in Affine Merge mode. The proposed augmented and improved affine mode includes evaluating multiple predictor candidates in the Affine Merge mode.

As discussed before, in the current JEM, the first neighboring CU coded in Affine Merge mode among the surrounding CUs is selected to predict the affine motion model associated with the current CU being encoded or decoded. That is, the first neighboring CU candidate among the ordered set (A, B, C, D, E) of FIG. 8B that is coded in affine mode is selected to predict the affine motion model of current CU.

Accordingly, at least one embodiment selects the Affine Merge prediction candidate that provides the best coding efficiency when coding the current CU in Affine Merge mode, instead of using just the first one in the ordered set as noted above. The improvements of this embodiment, at a general level, therefore comprise, for example:
constructing a set of multiple Affine Merge predictor candidates that is likely to provide a good set of candidates for the prediction of an affine motion model of a CU (for encoder/decoder);
selecting one predictor for the current CU's control point motion vector among the constructed set (for encoder/decoder); and/or
signaling/decoding the index of current CU's control point motion vector predictor (for encoder/decoder).

Figure 10:
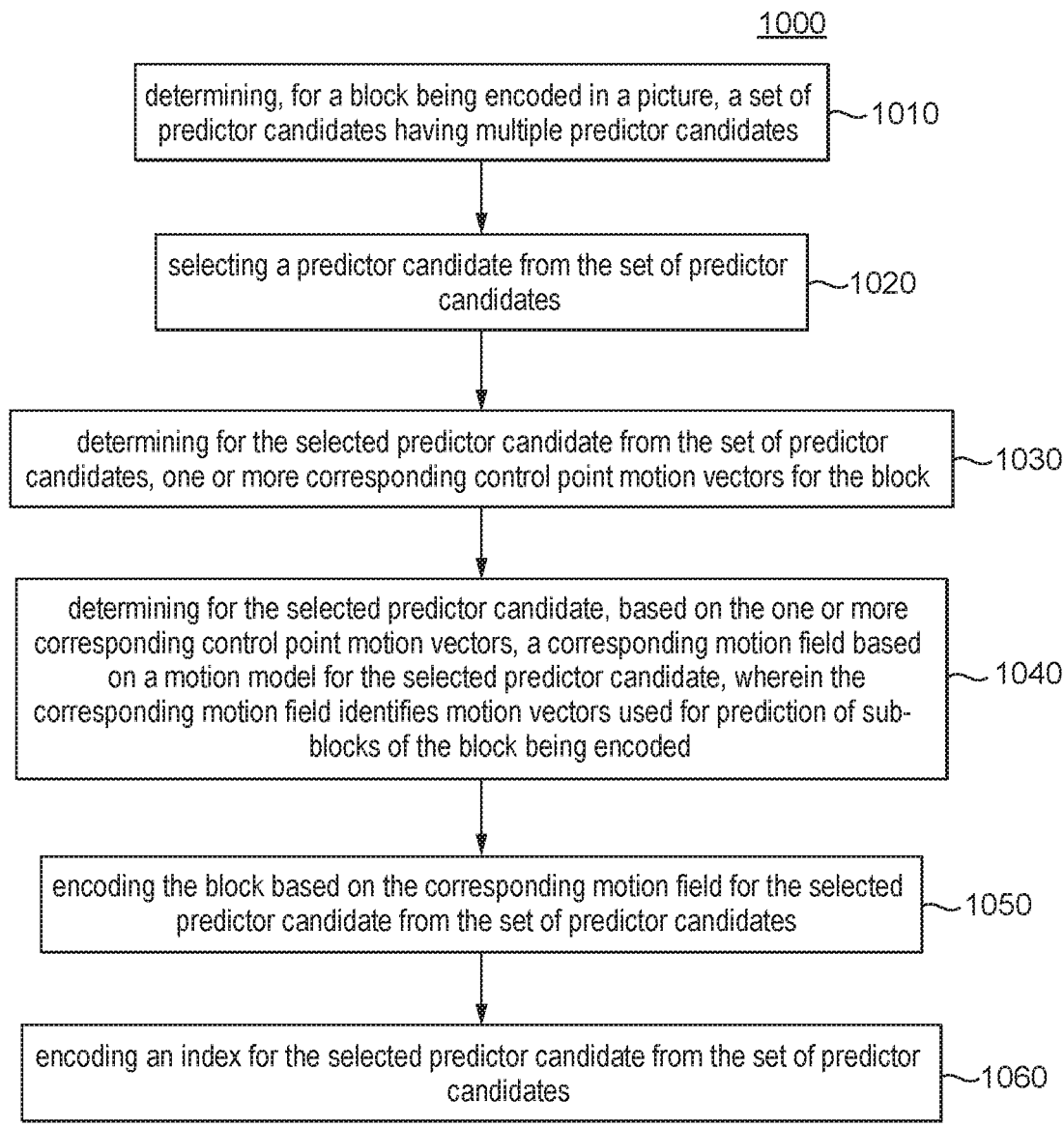
FIG. 10 illustrates an example method according to a general aspect of at least one embodiment.

Accordingly, FIG. 10 illustrates an exemplary encoding method 1000 according to a general aspect of at least one embodiment. At 1010, the method 1000 determines, for a block being encoded in a picture, a set of predictor candidates having multiple predictor candidates. At 1020, the method 1000 selects a predictor candidate from the set of predictor candidates. At 1030, the method 1000 determines for the selected predictor candidate from the set of predictor candidates, one or more corresponding control point motion vectors for the block. At 1040, the method 1000 determines for the selected predictor candidate, based on the one or more corresponding control point motion vectors, a corresponding motion field based on a motion model for the selected predictor candidate, wherein the corresponding motion field identifies motion vectors used for prediction of sub-blocks of the block being encoded. At 1050, the method 1000 encodes the block based on the corresponding motion field for the selected predictor candidate from the set of predictor candidates. At 1060, the method 1000 encodes an index for the selected predictor candidate from the set of predictor candidates.

Figure 11:
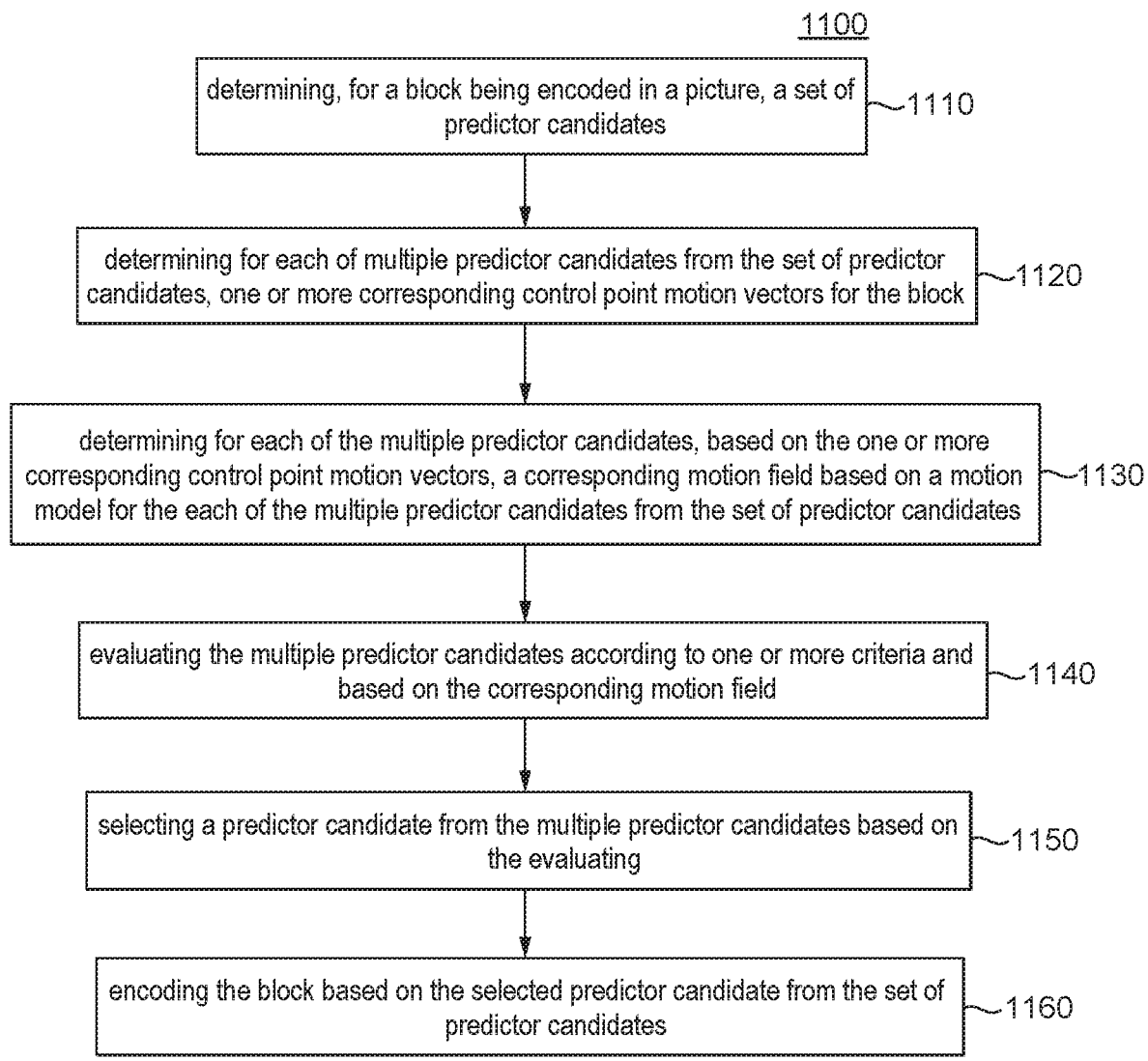
FIG. 11 illustrates another example method according to a general aspect of at least one embodiment.

FIG. 11 illustrates another exemplary encoding method 1100 according to a general aspect of at least one embodiment. At 1110, the method 1100 determines, for a block being encoded in a picture, a set of predictor candidates. At 1120, the method 1100 determines for each of multiple predictor candidates from the set of predictor candidates, one or more corresponding control point motion vectors for the block. At 1130, the method 1100 determines for each of the multiple predictor candidates, based on the one or more corresponding control point motion vectors, a corresponding motion field based on a motion model for the each of the multiple predictor candidates from the set of predictor candidates. At 1140, the method 1100 evaluates the multiple predictor candidates according to one or more criteria and based on the corresponding motion field. At 1150, the method 1100 selects a predictor candidate from the multiple predictor candidates based on the evaluation. At 1160, the method 1100 encodes an index for the selected predictor candidate from the set of predictor candidates.

Figure 12:
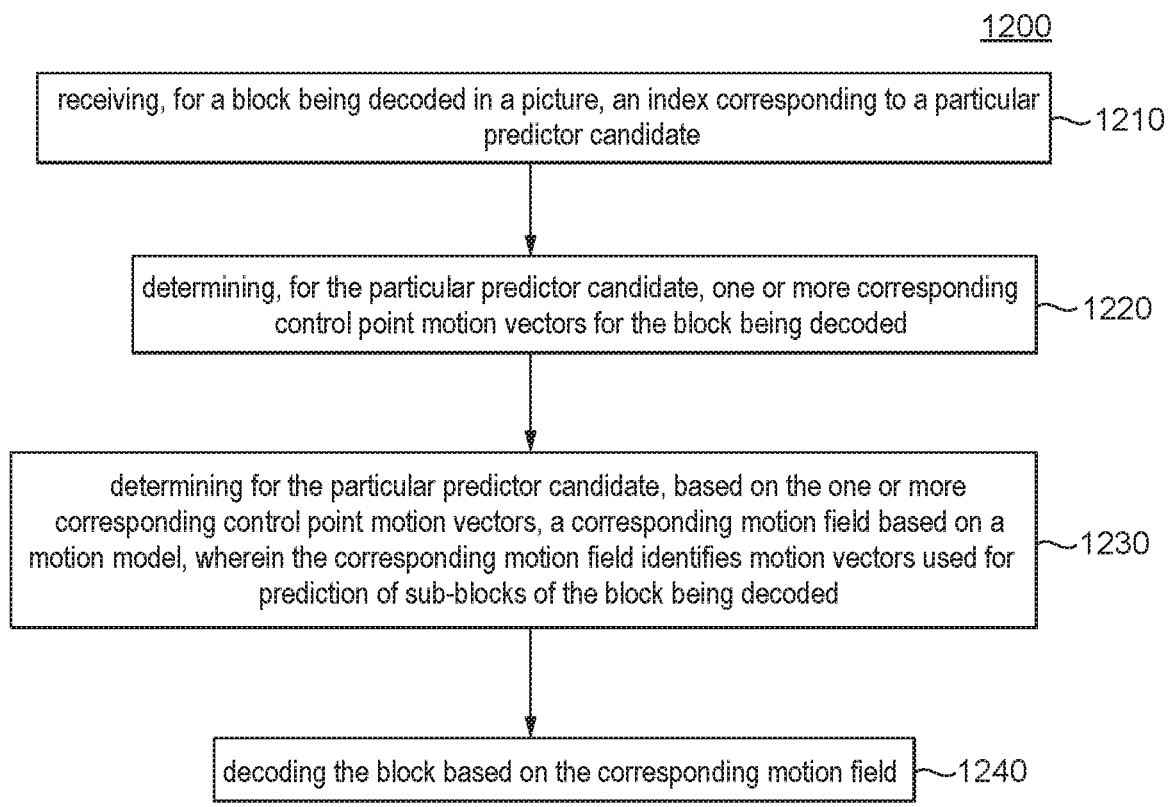
FIG. 12 also illustrates another example method according to a general aspect of at least one embodiment.

FIG. 12 illustrates an exemplary decoding method 1200 according to a general aspect of at least one embodiment. At 1210, the method 1200 receives, for a block being decoded in a picture, an index corresponding to a particular predictor candidate. In various embodiments, the particular predictor candidate has been selected at an encoder, and the index allows one of multiple predictor candidates to be selected. At 1220, the method 1200 determines, for the particular predictor candidate, one or more corresponding control point motion vectors for the block being decoded. At 1230, the method 1200 determines for the particular predictor candidate, based on the one or more corresponding control point motion vectors, a corresponding motion field. In various embodiments, the motion field is based on a motion model, wherein the corresponding motion field identifies motion vectors used for prediction of sub-blocks of the block being decoded. At 1240, the method 1200 decodes the block based on the corresponding motion field.

FIG. 13 illustrates another exemplary decoding method 1300 according to a general aspect of at least one embodiment. At 1310, the method 1300 retrieves, for a block being decoded in a picture, an index corresponding a selected predictor candidate. As also shown at 1310, the selected predictor candidate has been selected at an encoder by: determining, for a block being encoded in a picture, a set of predictor candidates; determining for each of multiple predictor candidates from the set of predictor candidates, one or more corresponding control point motion vectors for the block being encoded; determining for each of the multiple predictor candidates, based on the one or more corresponding control point motion vectors, a corresponding motion field based on a motion model for the each of the multiple predictor candidates from the set of predictor candidates; evaluating the multiple predictor candidates according to one or more criteria and based on the corresponding motion field; selecting a predictor candidate from the multiple predictor candidates based on the evaluating; and encoding an index for the selected predictor candidate from the set of predictor candidates. At 1320, the method 1300 decodes the block based on the index corresponding to the selected predictor candidate.

Figure 14:
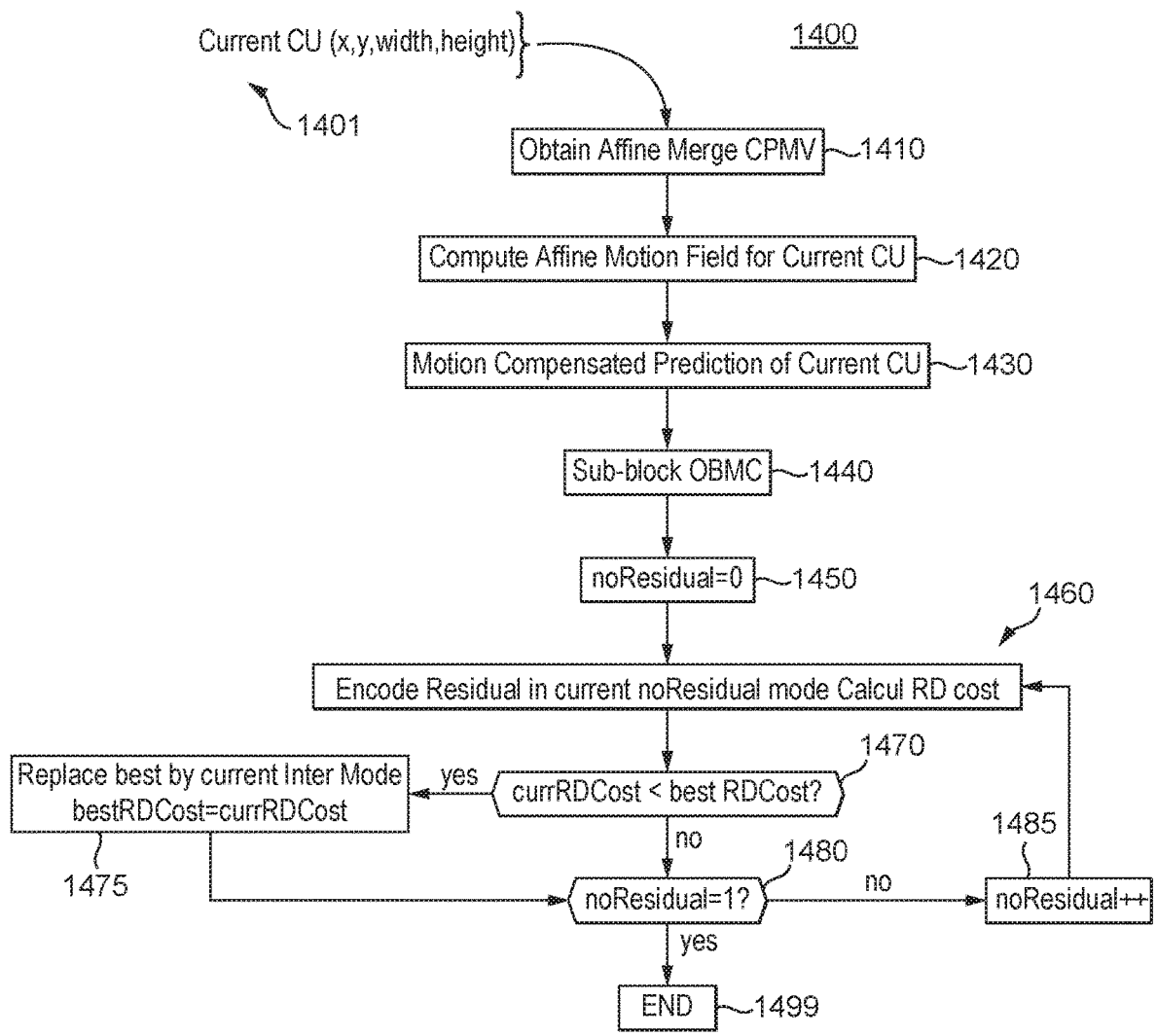
FIG. 14 illustrate an example of a known process for evaluating the Affine Merge mode of an inter-CU in JEM.

FIG. 14 illustrates the detail of an embodiment of a process 1400 used to predict the affine motion field of a current CU being encoded or decoded in the existing Affine Merge mode in JEM. The input 1401 to this process 1400 is the current Coding Unit for which one wants to generate the affine motion field of the sub-blocks as shown in FIG. 7. At 1410, the Affine Merge CPMVs for the current block are obtained with the selected predictor candidate as explained above in connection with, e.g., FIG. 6, FIG. 7, FIG. 8B, and FIG. 9. The derivation of this predictor candidate is also explained in more detail later with respect to FIG. 15.

As a result, at 1420, the top-left and top-right control point motion vectors $\vec{v}_0$ and $\vec{v}_1$ are then used to compute the affine motion field associated with the current CU. This consists in computing a motion vector for each 4×4 sub-block according to Equation 1 as explained before. At 1430 and 1440, once the motion field is obtained for the current CU, the temporal prediction of the current CU takes place, involving 4×4 sub-block based motion compensation and then OBMC (Overlapped Block Motion Compensation). At 1450 and 1460, the current CU is coded and reconstructed, successively with and without residual data. A mode is selected based on the RD competition, and that mode is used to encode the current CU, and an index for that mode is also encoded in various embodiments.

In at least one implementation, a residual flag is used. At 1450, a flag is activated (noResidual=0) indicating that the coding is done with residual data. At 1460, the current CU is fully coded and reconstructed (with residual) giving the corresponding RD cost. Then the flag is deactivated (1480, 1485, noResidual=1) indicating that the coding is done without residual data, and the process goes back to 1460 where the CU is coded (without residual) giving the corresponding RD cost. The lowest RD cost (1470, 1475) between the two previous ones indicates if residual must be coded or not (normal or skip). Method 1400 ends at 1499. Then this best RD cost is put in competition with other coding modes. Rate distortion determination will be explained in more detail below.

Figure 15:
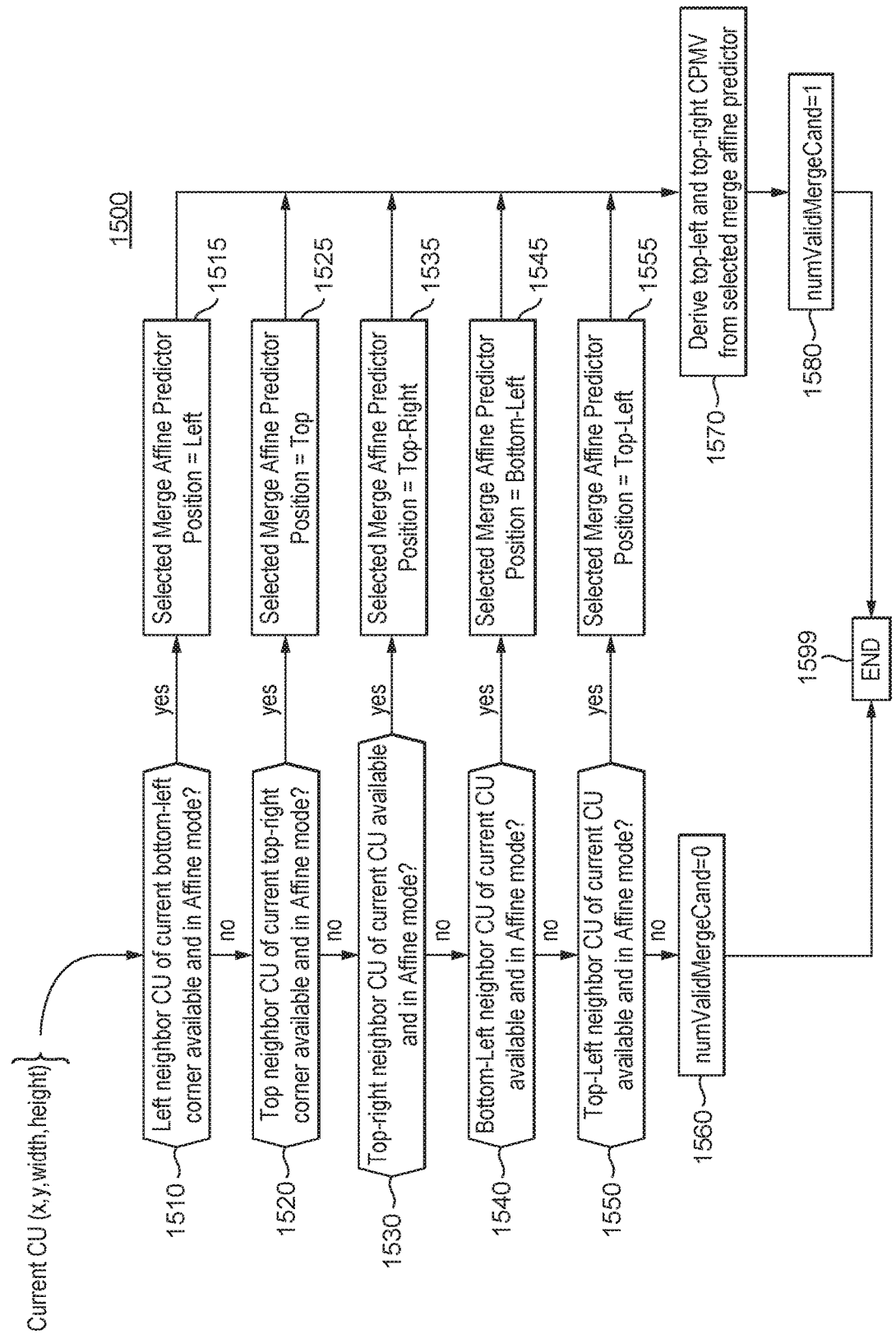
FIG. 15 illustrates an example of a process for choosing the predictor candidate in the Affine Merge mode in JEM.

FIG. 15 shows the detail of an embodiment of a process 1500 used to predict the one or more control points of the current CU's affine motion field. This consists in searching (1510, 1520, 1530, 1540, 1550) a CU that has been coded/decoded in Affine mode, among the spatial positions (A, B, C, D, E) of FIG. 8B. If none of the searched spatial positions is coded in Affine mode, then a variable indicating the number of candidate position, for example, numValidMergeCand, is set (1560) to 0. Otherwise, the first position that corresponds to a CU in Affine mode is selected (1515, 1525, 1535, 1545, 1555). The process 1500 then consists in computing control point motion vectors that will be used later to generate the affine motion field assigned to the current CU and setting (1580) numValidMergeCand to 1. This control point computation proceeds as follows. The CU that contains the selected position is determined. It is one of the neighbor CUs of current CU as explained before. Next, the 3 CPMVs $\vec{v}_2$, $\vec{v}_3$, and $\vec{v}_4$ from the top-left, top-right and bottom-left corners inside the selected neighbor CU are retrieved (or determined) as explained before in connection with FIG. 9. Finally, the top-left and top-right CPMVs $\vec{v}_0$, and $\vec{v}_1$ of the current CU are derived (1570), according to Equation 1, as explained before in connection with FIG. 6. Method 1500 ends at 1599.

The present inventors have recognized that one aspect of the existing Affine Merge process described above is that it systematically employs one and only one motion vector predictor to propagate an affine motion field from a surrounding causal (i.e., already encoded or decoded) and neighboring CU towards a current CU. In various situations, the present inventors have further recognized that this aspect can be disadvantageous because, for example, it does not select the optimal motion vector predictor. Moreover, the choice of this predictor consists only of the first causal and neighboring CU coded in Affine mode, in the ordered set (A, B, C, D, E), as already noted before. In various situations, the present inventors have further recognized that this limited choice can be disadvantageous because, for example, a better predictor might be available. Therefore, the existing process in the current JEM does not consider the fact that several potential causal and neighboring CUs around the current CU may also have used affine motion, and that a different CU other than the first one found to have used affine motion may be a better predictor for the current CU's motion information.

Therefore, the present inventors have recognized the potential advantages in several ways to improve the prediction of the current CU affine motion vectors that are not being exploited by the existing JEM codecs. According to a general aspect of at least one embodiment, such advantages provided in the present motion models may be seen and are illustrated in FIG. 16 and FIG. 17, as explained below.

Figure 16:
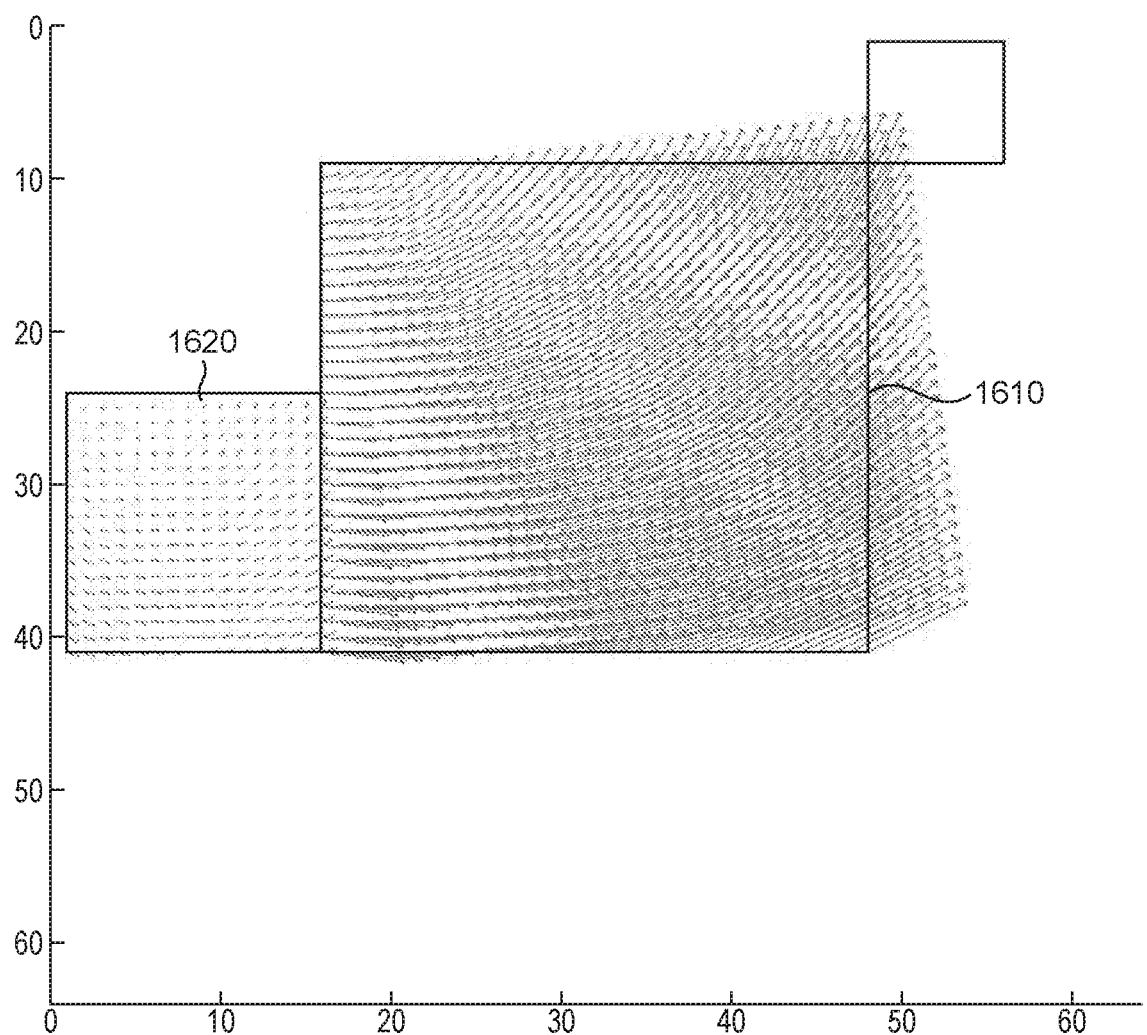
FIG. 16 illustrates an example of propagated affine motion fields through an Affine Merge predictor candidate located to the left of the current block being encoded or decoded.
Figure 17:
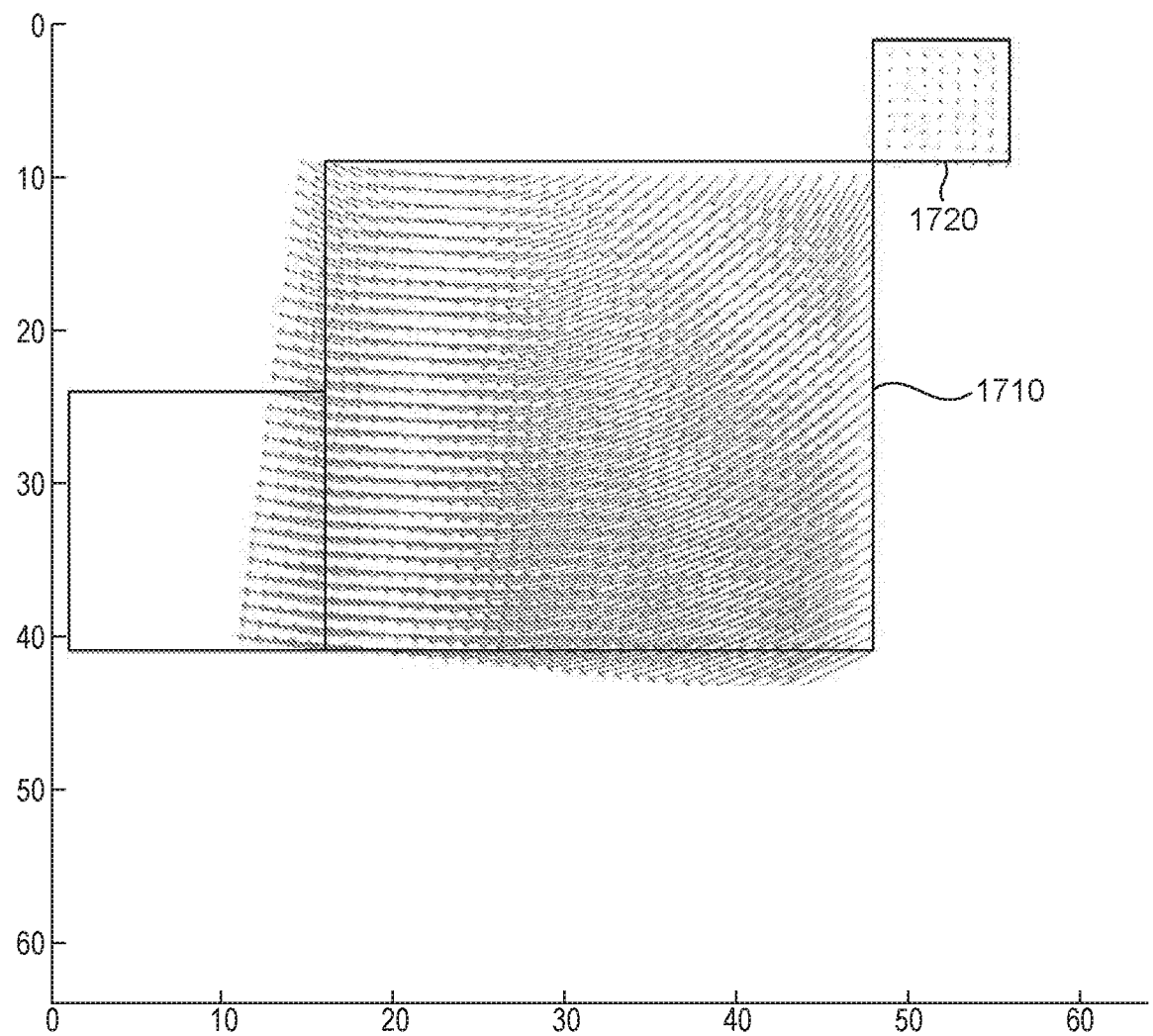
FIG. 17 illustrates an example of propagated affine motion fields through an Affine Merge predictor candidate located to the top and right of the current block being encoded or decoded.

In both FIG. 16 and FIG. 17, the current CU being encoded or decoded is the large one in the middle, respectively, 1610 in FIGS. 16 and 1710 in FIG. 17. The two potential predictor candidates correspond to positions A and C of FIG. 8B, and are shown respectively as predictor candidates 1620 in FIGS. 16 and 1720 in FIG. 17. In particular, FIG. 16 illustrates the potential motion fields of the current block 1610 being coded or decoded if the selected predictor candidate is located on the left position (position A of FIG. 8B). Likewise, FIG. 17 illustrates the potential motion fields of the current block 1710 being coded or decoded if the selected predictor candidate is located on the right and top position (i.e., position C of FIG. 8B). As shown in the illustrative figures, depending on which Affine Merge predictor is chosen, different sets of motion vectors for the sub-blocks may be generated for the current CU. Therefore, the present inventors recognize that one or more criteria such as e.g., a Rate Distortion (RD) optimized choice between these two candidates may help in improving the coding/decoding performance of the current CU in Affine Merge mode.

Therefore, one general aspect of at least one embodiment consists in selecting a better motion predictor candidate to derive the CPMV of a current CU being encoded or decoded, among a set of multiple candidates. On the encoder side, the candidate used to predict the current CPMV is chosen according to a rate distortion cost criteria, according to one aspect of one exemplary embodiment. Its index is then coded in the output bit-stream for the decoder, according to another aspect of another exemplary embodiment.

According to another aspect of another exemplary embodiment, in the decoder, the set of candidates may be built, and a predictor may be selected from the set, in the same way as on the encoder side. In such an embodiment, no index needs to be coded in the output bit-stream. Another embodiment of the decoder avoids building the set of candidates, or at least avoids selecting a predictor from the set as in the encoder, and simply decodes the index corresponding to the selected candidate from the bit-stream to derive the corresponding relevant data.

According to another aspect of another exemplary embodiment, CPMVs used herewith are not limited to the two at the top-right and top-left positions of the current CU being coded or decoded, as shown in FIG. 6. Other embodiments comprise, e.g., only one vector or more than two vectors, and the positions of these CPMVs are e.g., at other corner positions, or at any positions in or out of the current block, as long as it is possible to derive a motion field such as, e.g., at the position(s) of the center of the corner 4×4 sub-blocks, or the internal corner of the corner 4×4 sub-blocks.

Figure 18:
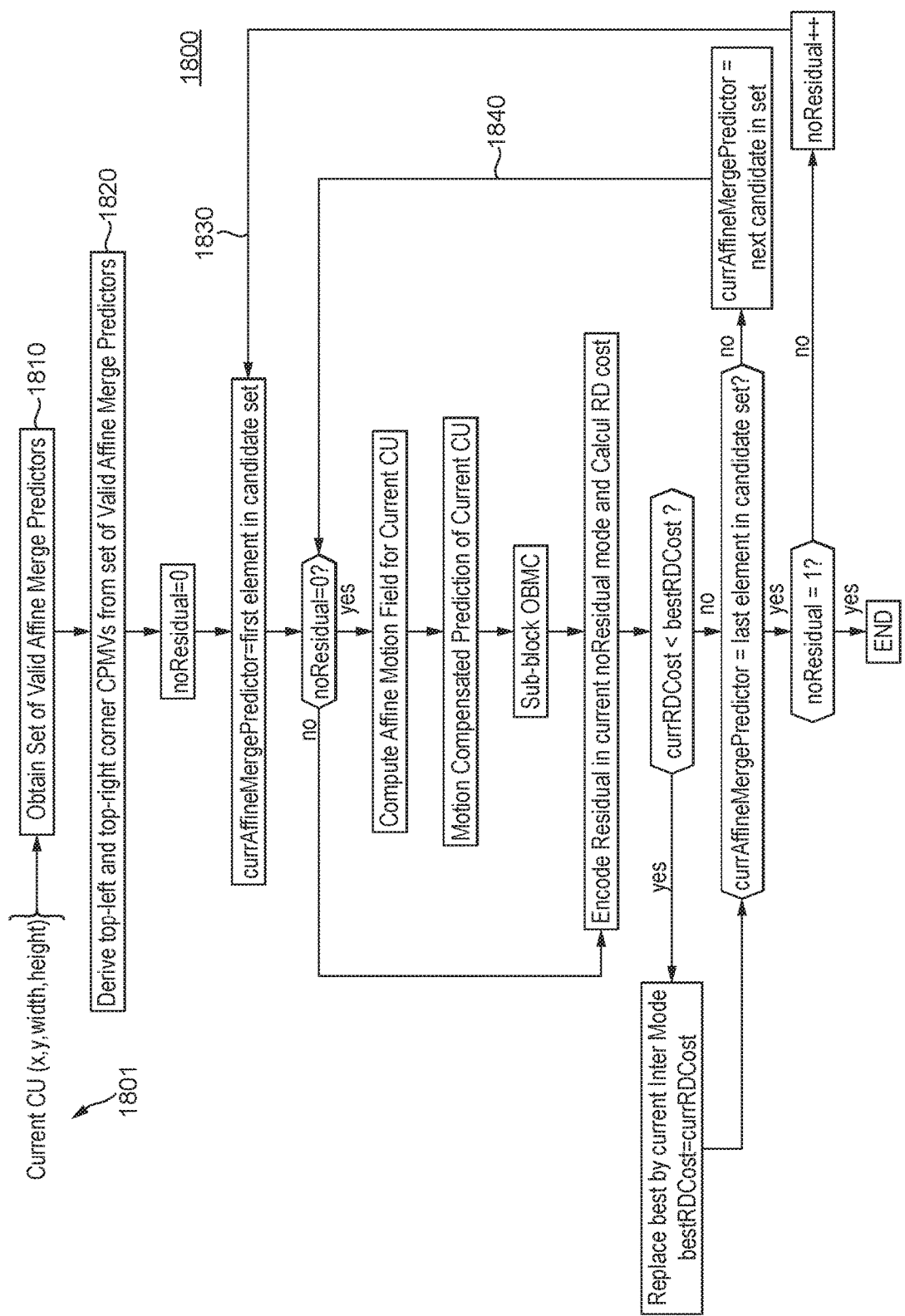
FIG. 18 illustrates an example of a predictor candidate selection process according to a general aspect of at least one embodiment.

In an exemplary embodiment, the set of potential candidate predictors being investigated is identical to the set of positions (A, B, C, D, E) used to retrieve the CPMV predictor in the existing Affine Merge mode in JEM, as illustrated in FIG. 8B. FIG. 18 illustrates the details of one exemplary selection process 1800 for selecting the best candidate to predict a current CU's affine motion model according to a general aspect of this embodiment. However, other embodiments use a set of predictor positions that is different from A, B, C, D, E, and that can include fewer or more elements in the set.

As shown at 1801, the input to this exemplary embodiment 1800 is also information of the current CU being encoded or decoded. At 1810, a set of multiple Affine Merge predictor candidates is built, according to the algorithm 1500 of FIG. 15, which was explained before. Algorithm 1500 of FIG. 15 includes gathering all neighboring positions (A, B, C, D, E) shown in FIG. 8A that corresponds to a causal CU which has been coded in Affine mode, into a set of candidates for the prediction of current CU affine motion. Thus, instead of stopping when a causal affine CU is found, the process 1800 stores all possible candidates for the affine motion model propagation from a causal CU to the current CU for all of the multiple motion predictor candidates in the set.

Once the process of FIG. 15 is done as shown at 1810 of FIG. 18, the process 1800 of FIG. 18, at 1820, computes the top-left and top-right corner CPMVs predicted from each candidate of the set provided at 1810. This process of 1820 is further detailed and illustrated by FIG. 19.

Figure 19:
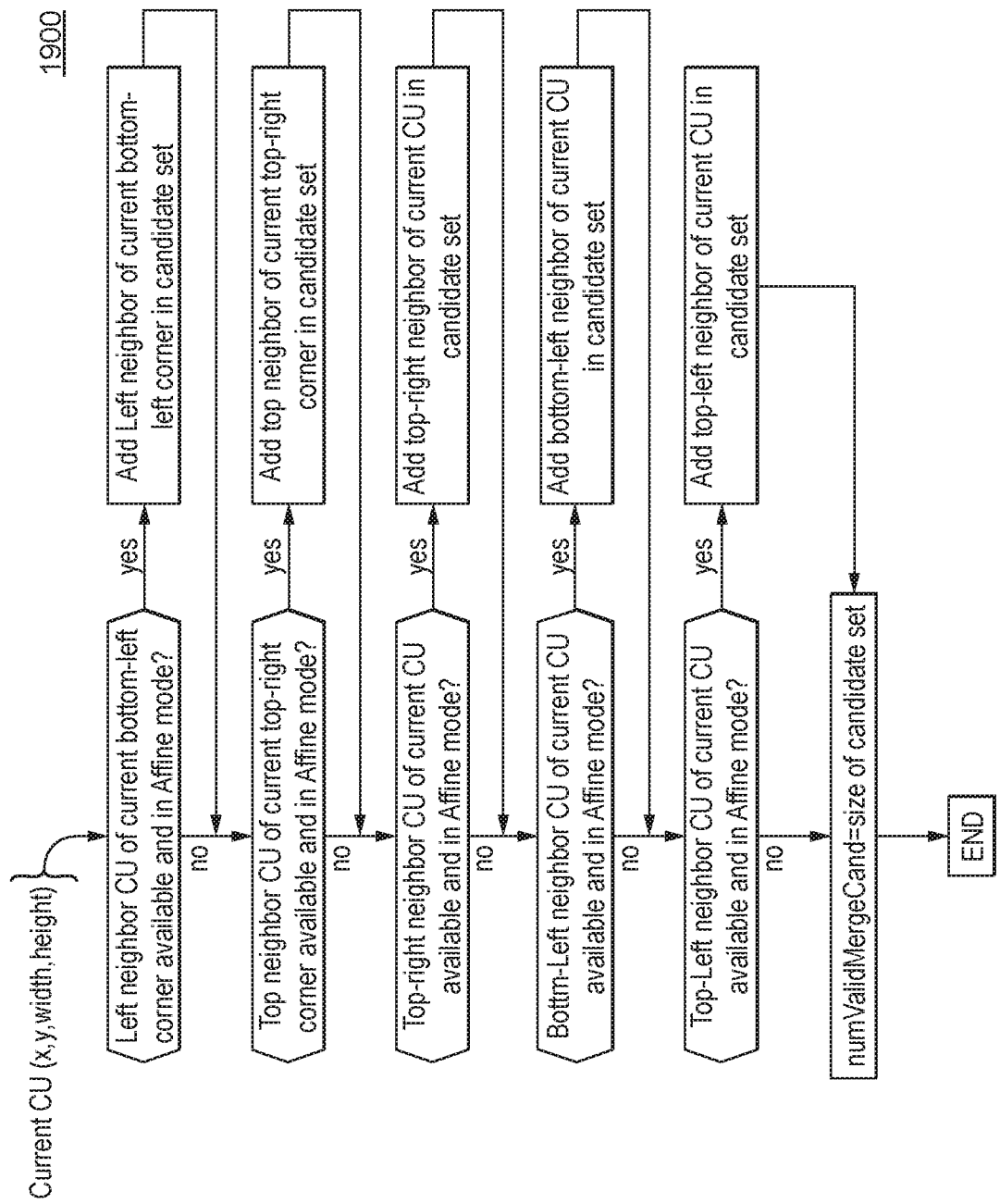
FIG. 19 illustrates an example of a process to build a set of multiple predictor candidates according to a general aspect of at least one embodiment.

Again, FIG. 19 shows the detail of 1820 in FIG. 18 and includes a loop over each candidate determined and found from the preceding step (1810 of FIG. 18). For each Affine Merge predictor candidate, the CU that contains the spatial position of that candidate is determined. Then for each reference list L0 and L1 (in the base of a B slice), the control point motion vectors $\vec{v}_0$ and $\vec{v}_1$ useful to produce the current CU's motion field are derived according to Equation 2. These two CPMVs for each candidate are stored in the set of candidate CPMVs.

Once the process of FIG. 19 is done and the process is returned to FIG. 18, a loop 1830 over each Affine Merge predictor candidate is performed. It may select, for example, the CPMV candidate that leads to the lowest rate distortion cost. Inside the loop 1830 over each candidate, another loop 1840 which is similar to the process as shown on FIG. 14 is used to code the current CU with each CPMV candidate as explained before. The algorithm of FIG. 14 ends when all candidates have been evaluated, and its output may comprise the index of the best predictor. As indicated before, as an example, the candidate with the minimum rate distortion cost may be selected as the best predictor. Various embodiments use the best predictor to encode the current CU, and certain embodiments also encode an index for the best predictor.

One example of a determination of the rate distortion cost is defined as follows, as is well known to a person skilled in the art:

$$RD_{cost} = D + \lambda \times R$$

wherein D represents the distortion (typically an L2 distance) between the original block and a reconstructed block obtained by encoding and decoding the current CU with the considered candidate; R represents the rate cost, e.g. the number of bits generated by coding the current block with the considered candidate; λ is the Lagrange parameter, which represents the rate target at which the video sequence is being encoded.

Another exemplary embodiment is described below. This exemplary embodiment aims at further improving the coding performance of the Affine Merge mode, by extending the set of Affine Merge candidates compared to the existing JEM. This exemplary embodiment may be executed both on the encoder and the decoder sides, in a similar manner, to extend the set of candidates. Accordingly, in one non-limiting aspect, some additional predictor candidates may be used to build the set of the multiple Affine Merge candidates. The additional candidates may be taken from additional spatial positions such as, e.g., A' 2110 and B' 2120 surrounding the current CU 2100 as illustrated in FIG. 21. Other embodiments use yet further spatial positions along, or in proximity to, one of the edges of the current CU 2100.

Figure 22:
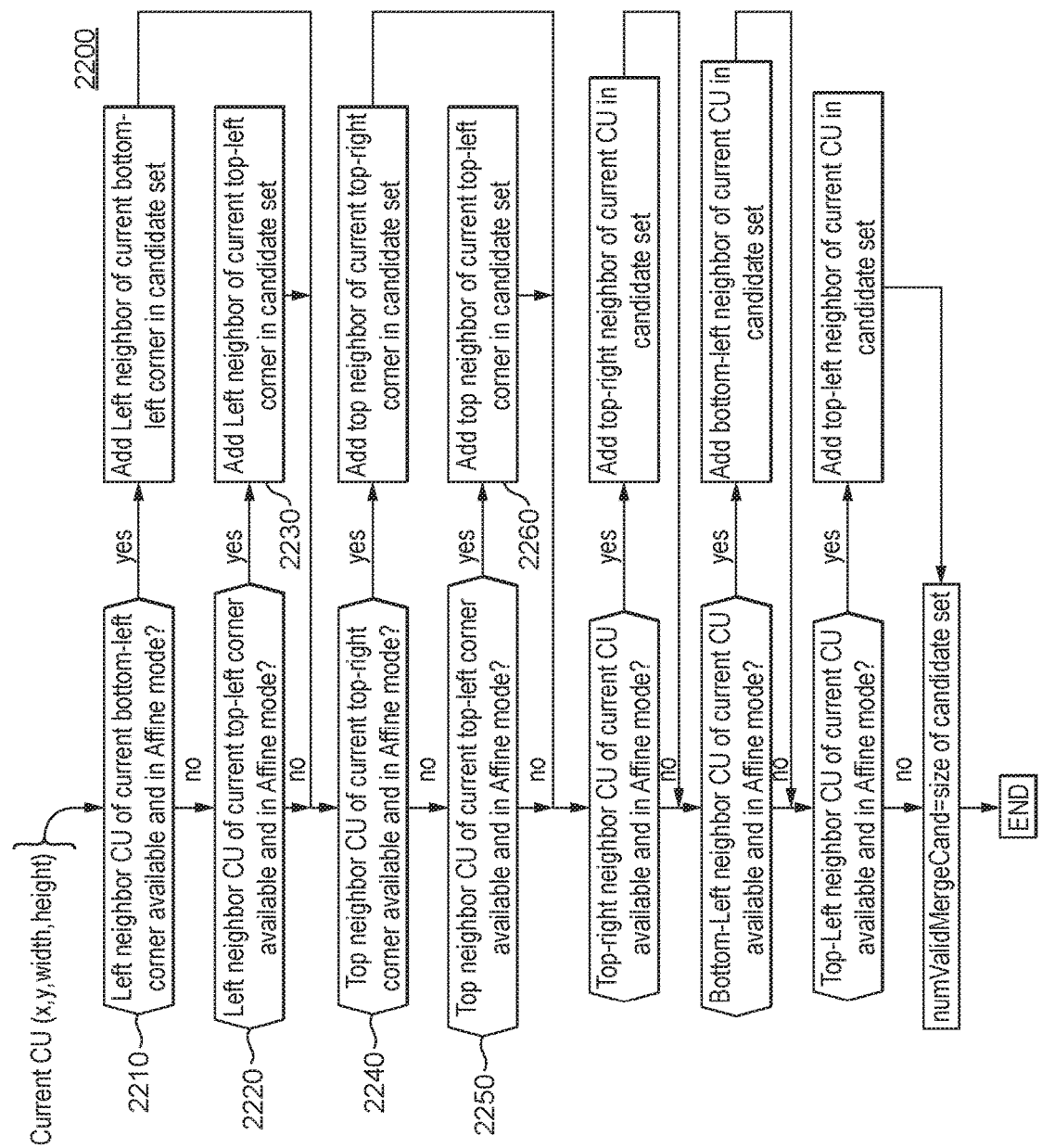
FIG. 22 illustrates another example of a process to build a set of multiple predictor candidates according to a general aspect of at least one embodiment.

FIG. 22 illustrates an exemplary algorithm 2200 that corresponds to the embodiment of using the additional spatial positions A' 2110 and B' 2120 as shown in FIG. 21 and described above. For example, the algorithm 2200 includes testing the new candidate position A' if position A is not a valid Affine Merge prediction candidate (e.g., is not in a CU coded in Affine mode) at 2210 to 2230 of FIG. 22. Likewise, for example, it also tests the position B' if the position B does not provide any valid candidate (e.g., is not in a CU coded in Affine mode) at 2240 to 2260 of FIG. 22. The remaining aspects of the exemplary process 2200 to build a set of Affine Merge candidates are essentially unchanged compared to FIG. 19 as shown and explained before.

Figure 23:
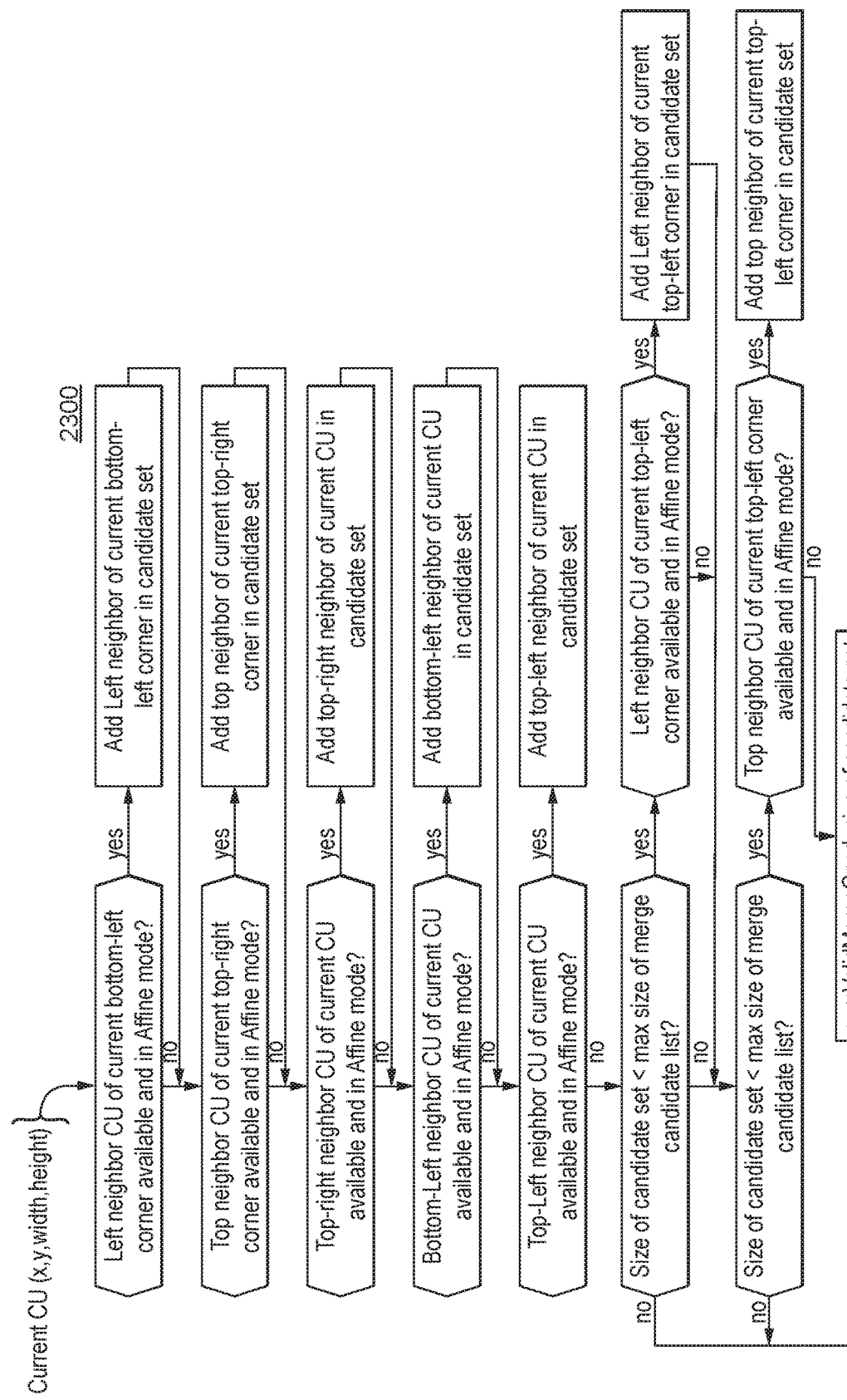
FIG. 23 also illustrates another example of a process to build a set of multiple predictor candidates according to a general aspect of at least one embodiment.

In another exemplary embodiment, existing merge candidate positions are considered first before evaluating newly added positions. The added positions are evaluated only if the set of candidates contains less candidates than a maximum number of merge candidate, for example, 5 or 7. The maximum number may be predetermined or be a variable. This exemplary embodiment is detailed by an exemplary algorithm 2300 of FIG. 23.

According to another exemplary embodiment, additional candidates, called temporal candidates, are added to the set of the predictor candidates. These temporal candidates may be used, for example, if no spatial candidates have been found as described above or, in a variant, if the size of the set of Affine Merge candidate has not reached a maximum value also as described before. Other embodiments use temporal candidates before adding spatial candidates to the set. For example, temporal candidates to predict the control point motion vectors of a current CU may be retrieved from one or more of the reference picture available or used for the current picture. The temporal candidates may be taken, for example, at positions corresponding to the bottom-right neighboring CU of the current CU in each of the reference pictures. This corresponds to the candidate position F 2410 for a current CU 2400 being encoded or decoded as shown in FIG. 24.

Figure 24:
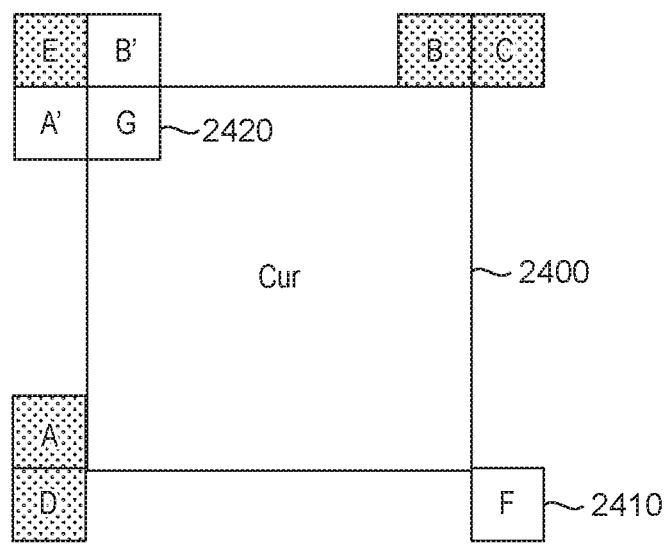
FIG. 24 illustrates an example of how temporal candidates may be used for predictor candidates according to a general aspect of at least one embodiment.

In an embodiment, for example, for each reference picture of each reference picture list, the affine flag associated with the block at position F 2410 of FIG. 24 in the considered reference picture is tested. If true, then the corresponding CU contained in that reference picture is added to the current set of Affine Merge candidates.

In a further variant, temporal candidates are retrieved from the reference pictures at the spatial position corresponding to the top-left corner of the current CU 2400. This position corresponds to the candidate position G 2420 of FIG. 24.

In a further variant, temporal candidates are retrieved from the reference pictures at the position corresponding to the bottom-right neighboring CU. Then, if the set of candidates contains less candidates than a prefixed maximum number of merge candidate, e.g., 5 or 7, the temporal candidates corresponding to the top-left corner G 2420 of the current CU are retrieved. In other embodiments, the temporal candidates are obtained from a position, in one or more reference pictures, corresponding to a different portion (other than G 2420) of the current CU 2400, or corresponding to another neighboring CU (other than F 2410) of the current CU 2400.

In addition, an exemplary derivation process for the control point motion vectors based on a temporal candidate proceeds as follows. For each temporal candidate contained in the constructed set, the block (tempCU) containing the temporal candidate in its reference picture is identified. Then the three CPMVs $\vec{v_2}$, $\vec{v_3}$, and $\vec{v_4}$ located at top-left, top-right and bottom-left corners of the identified temporal CU are scaled. This scaling takes into account the relationship between the POC (Picture Order Count) of tempCU, the POC of the reference picture of tempCU (difference is denoted tempDist), the POC of the current CU, and the POC of the reference picture of the current CU (difference is denoted curDist). For example, CPMVs can be scaled by the ratio between the distances (tempDist/curDist). Once these three scaled CPMVs are obtained, the two Control Point Motion Vectors for the current CU are derived according to Equation 2 as described before.

Figure 25:
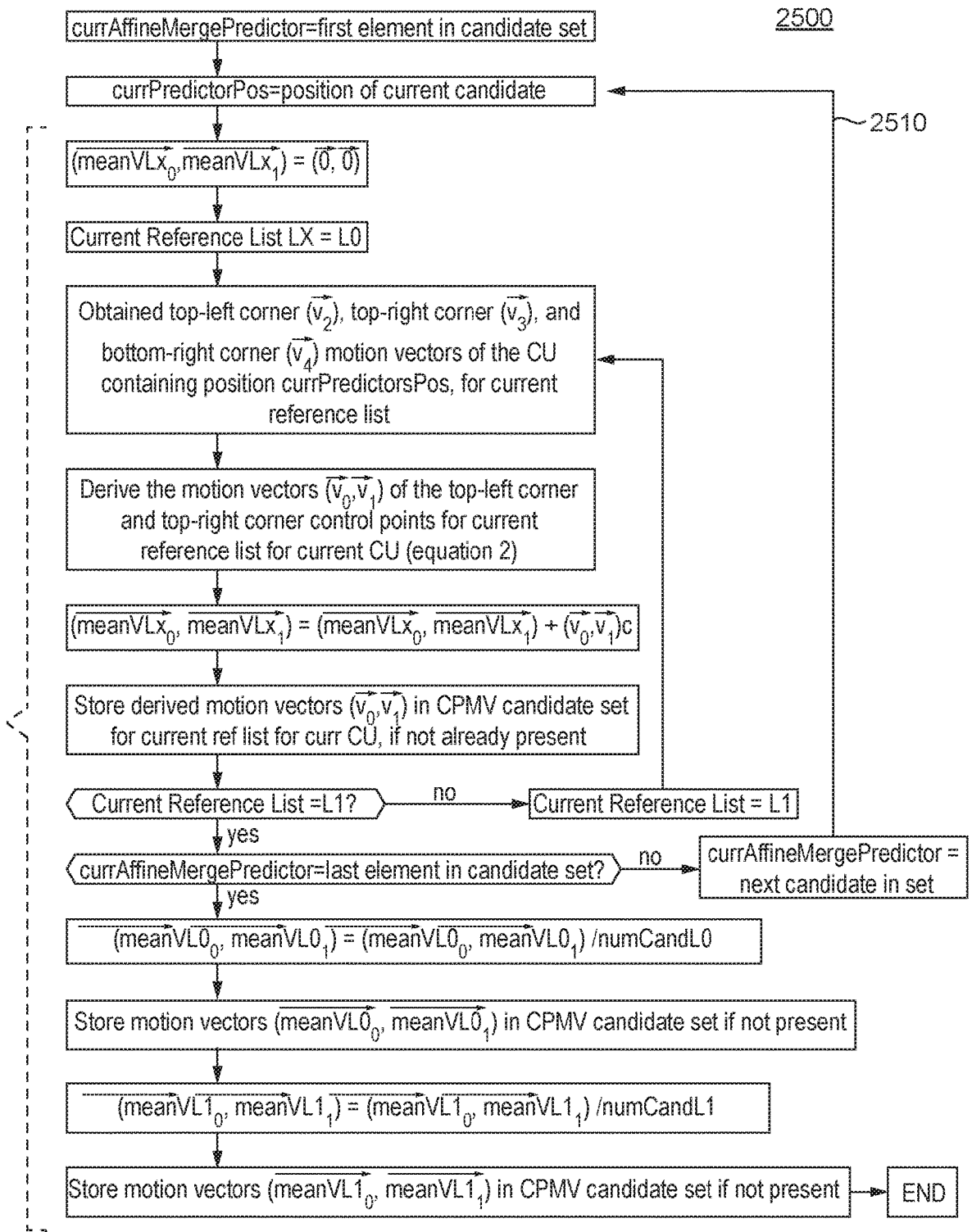
FIG. 25 illustrates an example of a process of adding the mean CPMV motion vectors computed of the stored CPMV candidate to the final CPMV candidate set according to a general aspect of at least one embodiment.

Another exemplary embodiment includes adding a mean Control Point Motion Vector pair computed as a function of the control point motion vectors derived from each candidate. The exemplary process here is detailed by an exemplary algorithm 2500 shown in FIG. 25. A loop 2510 is used for each Affine Merge predictor candidate in the set constructed for the considered reference picture list.

Then at 2520, for each reference picture list Lx, successively equal to L0 and then L1 (if in a B slice), if the current candidate has valid CPMVs for list Lx:

Initialize the pair of motion vectors ($\overrightarrow{\text{meanVLx}_0}$, $\overrightarrow{\text{meanVLx}_1}$) to ($\vec{0}, \vec{0}$)
For each candidate
    derive the CPMV ($\vec{v_0}, \vec{v_1}$) from current candidate CPMVs according to Equation 2.
    add ($\vec{v_0}, \vec{v_1}$) to the pair ($\overrightarrow{\text{meanVLx}_0}, \overrightarrow{\text{meanVLx}_1}$);
divide the pair of motion vectors ($\overrightarrow{\text{meanVLx}_0}, \overrightarrow{\text{meanVLx}_1}$) by the number of candidates for list Lx;
assign the reference picture index to the motion vectors $\overrightarrow{\text{meanVLx}_0}$ and $\overrightarrow{\text{meanVLx}_1}$, equal to the minimum reference picture index among all candidates of each list respectively (The vector $\overrightarrow{\text{meanVLx}_0}$ refers to list0 and its associated reference index is set to the minimum reference index observed among all the candidates in list0. The vector $\overrightarrow{\text{meanVLx}_1}$ is the same, except applied to list1.);
add the obtained mean pair of motion vectors ($\overrightarrow{\text{meanVLx}_0}, \overrightarrow{\text{meanVLx}_1}$) to the set of candidate CPMVs to generate the affine motion field of current CU for list Lx.

Using the algorithm 2500 and/or other embodiments, the set of Affine Merge candidates is being further enriched, and contains the mean motion information computed from the CPMV derived for each candidate inserted into the set of candidates, according to the previous embodiments as described in the preceding sections.

Because it is possible that several candidates lead to the same CPMV for the current CU, the above mean candidate may result in a weighted average pair of CPMV motion vectors. Indeed, the process described above would compute the average of the CPMVs collected so far, regardless of their uniqueness in the complete set of CPMVs. Therefore, a variant of this embodiment consists in adding again another candidate to the set of CPMV prediction candidates. It consists in adding the average CPMV of the set of unique collected CPMVs (apart from the weighted mean CPMV as described above). This provides a further candidate CPMV in the set of the predictor candidates to produce the Affine Motion field of the current CU.

For example, consider the situation in which the following five spatial candidates are all available and affine (L, T, TR, BL, TL). However, the 3 left positions (L, BL, TL) are within the same neighboring CU. In each spatial position, we can get candidate CPMVs. Then, the first mean is equal to the sum of these 5 CPMVs divided by 5 (even though several are identical). In the second mean, only different CPMVs are considered, so the 3 left ones (L, BL, TL) are only considered once and the second mean is equal to the 3 different CPMVs (L, T, TR) divided by 3. In the first mean, redundant CPMVs are added 3 times which gives more weight to the redundant CPMVs. Using equations, we may write that mean1=(L+T+TR+BL+TL)/5 with L=BL=TL so mean1=(3*L+T+TL)/5, while mean2=(L+T+TL)/3.

The two previously described candidate means are bi-directional as soon as a considered candidate holds a motion vector for a reference image in list 0 and another in list 1. In another variant, it is possible to add uni-directional means. From the weighted and the unique mean, four uni-directional candidates may be constructed by picking motion vectors from list 0 and list 1 independently.

One advantage of the exemplary candidate set extension methods described in this application is an increase in the variety in the set of candidate Control Point Motion Vectors that may be used to construct the affine motion field associated with a given CU. Thus, the present embodiments provide technological advancement in the computing technology of video content encoding and decoding. For example, the present embodiments improve the rate distortion performance provided by the Affine Merge coding mode in JEM. This way, the overall rate distortion performance of the considered video codec has been improved.

A further exemplary embodiment may be provided to modify the process of FIG. 18. The embodiment includes a fast evaluation of the performance of each CPMV candidate, through the following approximate distortion and rate computation. Accordingly, for each candidate in the set of CPMVs, the motion field of current CU is computed, and the 4×4 sub-block-based temporal prediction of the current CU is performed. Next the distortion is computed as the SATD between the predicted CU and the original CU. The rate cost is obtained as an approximated number of bits linked to the signaling of the merge index of a considered candidate. A rough (approximate) RD cost is then obtained for each candidate. The final selection is based on the approximate RD cost in one embodiment. In another embodiment, a subset of candidates undergo the full RD search, i.e. candidates that have the lowest approximate RD cost then undergo the full RD search. The advantage of these embodiments is that they limit the encoder-side complexity increase that arises from the search for the best Affine Merge predictor candidate.

Also, according to another general aspect of at least one embodiment, the Affine Inter mode as described before may also be improved with all of the current teachings presented herewith by having an extended list of Affine predictor candidates. As described above in connection with FIG. 8A, one or more CPMVPs of an Affine Inter CU are derived from neighboring motion vectors regardless of their coding mode. Therefore, it is then possible to take advantage of the affine neighbors with their affine model to construct the one or more CPMVPs of the current Affine Inter CU, as in Affine Merge mode as described before. In that case, the considered affine candidates may be the same list as described above for Affine Merge mode (e.g., not limited to only spatial candidates).

Accordingly, a set of multiple predictor candidates are provided to improve compression/decompression being provided by the current HEVC and JEM by using better predictor candidates. The process will be more efficient and coding gain will be observed even if it may be needed to transmit a supplemental index.

According to a general aspect of at least one embodiment, the set of Affine Merge candidates (with at least 7 candidates as in Merge mode) is composed of, e.g.:

Spatial candidates from (A, B, C, D, E),

Temporal candidates of the bottom-right co-located position if less than 5 candidates in the list, Temporal candidates of the co-located position if less than 5 candidates in the list, Weighted mean Unique mean Uni-directional means from weighted mean if weighted mean is bi-directional and if less than 7 candidates in the list, Uni-directional means from unique mean if unique mean is bi-directional and if less than 7 candidates in the list.

Also, in the AMVP case, predictor candidates may be taken from, e.g.:

Spatial candidates from set (A, B, C, D, E),

Supplemental spatial candidates from (A', B'),

Temporal candidates of the bottom-right co-located position.

TABLE 1 and TABLE 2 below show the improvements over JEM 4.0 (parallel) using exemplary embodiments of some of the present proposed solutions. Each table shows the results of the amounts of rate reductions for one of the exemplary embodiments as described above. In particular, TABLE 1 shows the improvements when the 5 spatial candidates (A, B, C, D, E) shown in FIG. 8B are used as the set of the multiple predictor candidates according to an exemplary embodiment described above. TABLE 2 shows the improvements for an exemplary embodiment when the following order of the predictor candidates is used as described above: spatial candidates first, then temporal candidates if the number of candidates is still less than 5, then means, and finally uni-directional means if the number of candidates is still less than 7. Accordingly, for example, TABLE 2 shows that for this embodiment, the rate reductions for Y, U, V samples are respectively 0.22%, 0.26%, and 0.12% BD (Bjøntegaard-Delta) rate reductions for Class D, with almost no increase in the encoding and decoding running times (i.e., 100% and 101% respectively). Thus, the present exemplary embodiments improve the compression/decompression efficiency while maintaining the computational complexity cost over the existing JEM implementations.

TABLE 1

Results of RDO selection of the best CPMV using spatial candidates over JEM 4.0

Random Access Main 10

| | Over JEM 4.0 (parallel) | | | | |
|---|---|---|---|---|---|
| | Y | U | V | EncT | DecT |
| Class C | −0.04% | 0.09% | −0.12% | 100% | 100% |
| Class D | −0.07% | −0.20% | −0.11% | 100% | 100% |

TABLE 2

Results of RDO selection of the best CPMV using spatial, temporal, means and then uni-directional means candidates over JEM 4.0

Random Access Main 10

| | Over JEM 4.0 (parallel) | | | | |
|---|---|---|---|---|---|
| | Y | U | V | EncT | DecT |
| Class C | −0.15% | 0.02% | −0.12% | 100% | 101% |
| Class D | −0.22% | −0.26% | −0.12% | 100% | 101% |

Figure 26:
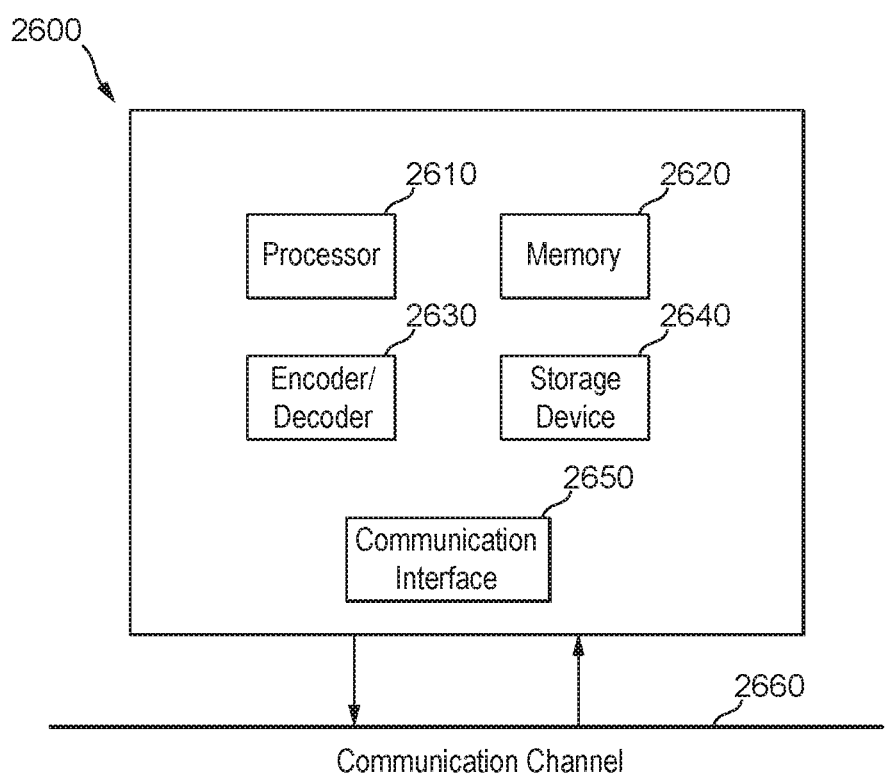
FIG. 26 illustrates a block diagram of an example apparatus in which various aspects of the embodiments may be implemented.

FIG. 26 illustrates a block diagram of an exemplary system 2600 in which various aspects of the exemplary embodiments may be implemented. The system 2600 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 2600 may be communicatively coupled to other similar systems, and to a display via a communication channel as shown in FIG. 26 and as known by those skilled in the art to implement all or part of the exemplary video systems described above.

Various embodiments of the system 2600 include at least one processor 2610 configured to execute instructions loaded therein for implementing the various processes as discussed above. The processor 2610 may include embedded memory, input output interface, and various other circuitries as known in the art. The system 2600 may also include at least one memory 2620 (e.g., a volatile memory device, a non-volatile memory device). The system 2600 may additionally include a storage device 2640, which may include non-volatile memory, including, but not limited to, EEPROM, ROM, PROM, RAM, DRAM, SRAM, flash, magnetic disk drive, and/or optical disk drive. The storage device 2640 may comprise an internal storage device, an attached storage device, and/or a network accessible storage device, as non-limiting examples. The system 2600 may also include an encoder/decoder module 2630 configured to process data to provide encoded video and/or decoded video, and the encoder/decoder module 2630 may include its own processor and memory.

The encoder/decoder module 2630 represents the module(s) that may be included in a device to perform the encoding and/or decoding functions. As is known, such a device may include one or both of the encoding and decoding modules. Additionally, the encoder/decoder module 2630 may be implemented as a separate element of the system 2600 or may be incorporated within one or more processors 2610 as a combination of hardware and software as known to those skilled in the art.

Program code to be loaded onto one or more processors 2610 to perform the various processes described hereinabove may be stored in the storage device 2640 and subsequently loaded onto the memory 2620 for execution by the processors 2610. In accordance with the exemplary embodiments, one or more of the processor(s) 2610, the memory 2620, the storage device 2640, and the encoder/decoder module 2630 may store one or more of the various items during the performance of the processes discussed herein above, including, but not limited to the input video, the decoded video, the bitstream, equations, formulas, matrices, variables, operations, and operational logic.

The system 2600 may also include a communication interface 2650 that enables communication with other devices via a communication channel 2660. The communication interface 2650 may include, but is not limited to a transceiver configured to transmit and receive data from the communication channel 2660. The communication interface 2650 may include, but is not limited to, a modem or network card and the communication channel 2650 may be implemented within a wired and/or wireless medium. The various components of the system 2600 may be connected or communicatively coupled together (not shown in FIG. 26) using various suitable connections, including, but not limited to internal buses, wires, and printed circuit boards.

The exemplary embodiments may be carried out by computer software implemented by the processor 2610 or by hardware, or by a combination of hardware and software. As a non-limiting example, the exemplary embodiments may be implemented by one or more integrated circuits. The memory 2620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 2610 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Furthermore, one skilled in the art may readily appreciate that the exemplary HEVC encoder 100 shown in FIG. 1 and the exemplary HEVC decoder shown in FIG. 3 may be modified according to the above teachings of the present disclosure in order to implement the disclosed improvements to the exiting HEVC standards for achieving better compression/decompression. For example, entropy coding 145, motion compensation 170, and motion estimation 175 in the exemplary encoder 100 of FIG. 1, and entropy decoding 330, and motion compensation 375, in the exemplary decoder of FIG. 3 may be modified according to the disclosed teachings to implement one or more exemplary aspects of the present disclosure including providing an enhanced affine merge prediction to the existing JEM.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
accessing, for a block being encoded in a picture, a set of predictor candidates having multiple predictor candidates, wherein said block is encoded in an affine merge mode;
selecting a predictor candidate from the set of predictor candidates, wherein said predictor candidate corresponds to a spatial or a temporal neighboring block that has been encoded;
obtaining, using a set of control point motion vectors stored for the selected predictor candidate from the set of predictor candidates, a set of control point motion vectors for the block, wherein motion vectors for motion-compensated prediction of all sub-blocks of said neighboring block are obtained using said set of control point motion vectors for said neighboring block based on an affine motion model, wherein said set of control point motion vectors for said neighboring block are stored separately from said motion vectors for motion-compensated prediction of all sub-blocks of said neighboring block;
obtaining, based on the set of control point motion vectors for said block being encoded, a motion field based on said affine motion model, wherein the motion field identifies motion vectors used for motion-compensated prediction of all sub-blocks of the block being encoded;
storing the set of control point motion vectors for the block separately from the motion vectors of the motion field for the block, as motion information for the block;
encoding the block based on the motion field; and
encoding an index for the selected predictor candidate from the set of predictor candidates.

2. The method of claim 1, wherein the stored motion vectors of the motion field are for motion compensation of the block.

3. The method of claim 1, wherein a complete motion vector field for said neighboring block is stored.

4. The method of claim 1, wherein said block has a size of 4 in width or height.

5. The method of claim 1, wherein said set of control point motion vectors for said block is derived from said set of control point motion vectors for said predictor candidate, width and height of said block and width and height of said predictor candidate.

6. A method for video decoding, comprising:
accessing, for a block being decoded in a picture, an index corresponding to a predictor candidate of a plurality of predictor candidates, wherein the predictor candidate corresponds to a spatial or a temporal neighboring block that has been decoded, and wherein said block is decoded in an affine merge mode;
obtaining, using a set of control point motion vectors stored for the predictor candidate, a set of control point motion vectors for the block being decoded, wherein motion vectors for motion-compensated prediction of all sub-blocks of said neighboring block are obtained using said set of control point motion vectors for said neighboring block based on an affine motion model, wherein said set of control point motion vectors for said neighboring block are stored separately from said motion vectors for motion-compensated prediction of all sub-blocks of said neighboring block;
obtaining, based on the set of control point motion vectors for the block being decoded, a motion field based on said affine motion model, wherein the motion field identifies motion vectors used for motion-compensated prediction of all sub-blocks of the block being decoded;
storing the set of control point motion vectors for the block separately from the motion vectors of the motion field for the block, as motion information for the block; and
decoding the block based on the motion field.

7. The method of claim 6, wherein the stored motion vectors of the motion field are for motion compensation of the block.

8. The method of claim 6, wherein a complete motion vector field for said neighboring block is stored.

9. The method of claim 6, wherein said block has a size of 4 in width or height.

10. The method of claim 6, wherein said set of control point motion vectors for said block is derived from said set of control point motion vectors for said predictor candidate, width and height of said block and width and height of said predictor candidate.

11. An apparatus for video encoding, comprising:
one or more processors, wherein said one or more processors are configured to:
access, for a block being encoded in a picture, a set of predictor candidates having multiple predictor candidates, wherein said block is encoded in an affine merge mode;
select a predictor candidate from the set of predictor candidates, wherein said predictor candidate corresponds to a spatial or a temporal neighboring block that has been encoded;
obtain, using a set of control point motion vectors stored for the selected predictor candidate from the set of predictor candidates, a set of control point motion vectors for the block, wherein motion vectors for motion-compensated prediction of all sub-blocks of said neighboring block are obtained using said set of control point motion vectors for said neighboring block based on an affine motion model, wherein said set of control point motion vectors for said neighboring block are stored separately from said motion vectors for motion-compensated prediction of all sub-blocks of said neighboring block;
obtain, based on the set of control point motion vectors for the block being encoded, a motion field based on said affine motion model, wherein the motion field identifies motion vectors used for prediction of all sub-blocks of the block being encoded;
store the set of control point motion vectors for the block separately from the motion vectors of the motion field for the block, as motion information for the block;
encode the block based on the motion field; and
encode an index for the selected predictor candidate from the set of predictor candidates.

12. The apparatus of claim 11, wherein the stored motion vectors of the motion field are for motion compensation of the block.

13. The apparatus of claim 11, wherein a complete motion vector field for said neighboring block is stored.

14. The apparatus of claim 11, wherein said block has a size of 4 in width or height.

15. The apparatus of claim 11, wherein said set of control point motion vectors for said block is derived from said set of control point motion vectors for said predictor candidate, width and height of said block and width and height of said predictor candidate.

16. An apparatus for video decoding, comprising:
one or more processors, wherein the one or more processors are configured to:
access, for a block being decoded in a picture, an index corresponding to a predictor candidate of a plurality of predictor candidates, wherein the predictor candidate corresponds to a spatial or a temporal neighboring block that has been decoded, and wherein said block is decoded in an affine merge mode;
obtain, using a set of control point motion vectors stored for the predictor candidate, a set of control point motion vectors for the block being decoded, wherein motion vectors for motion-compensated prediction of all sub-blocks of said neighboring block are obtained using said set of control point motion vectors for said neighboring block based on an affine motion model, wherein said set of control point motion vectors for said neighboring block are stored separately from said motion vectors for motion-compensated prediction of all sub-blocks of said neighboring block;
obtain, based on the set of control point motion vectors for the block being decoded, a motion field based on said affine motion model, wherein the motion field identifies motion vectors used for motion-compensated prediction of all sub-blocks of the block being decoded;
store the set of control point motion vectors for the block separately from the motion vectors of the motion field for the block, as motion information for the block; and
decode the block based on the motion field.

17. The apparatus of claim 16, wherein the stored motion vectors of the motion field are for motion compensation of the block.

18. The apparatus of claim 16, wherein a complete motion vector field for said neighboring block is stored.

19. The apparatus of claim 16, wherein said block has a size of 4 in width or height.

20. The apparatus of claim 16, wherein said set of control point motion vectors for said block is derived from said set of control point motion vectors for said predictor candidate, width and height of said block and width and height of said predictor candidate.

* * * * *